United States Patent
Walker

(10) Patent No.: US 9,960,990 B2
(45) Date of Patent: May 1, 2018

(54) SYSTEMS AND METHODS FOR MONITORING AND MANAGING COMMUNICATION PATHS

(71) Applicant: xCelor LLC, Chicago, IL (US)

(72) Inventor: Robert James Walker, Chicago, IL (US)

(73) Assignee: xCelor LLC, Chicago, IL (US)

( * ) Notice: Subject to any disclaimer, the term of this patent is extended or adjusted under 35 U.S.C. 154(b) by 233 days.

(21) Appl. No.: 14/877,688

(22) Filed: Oct. 7, 2015

(65) Prior Publication Data

US 2017/0048131 A1 Feb. 16, 2017

Related U.S. Application Data

(60) Provisional application No. 62/204,344, filed on Aug. 12, 2015, provisional application No. 62/204,350, (Continued)

(51) Int. Cl.
*H04L 12/751* (2013.01)
*H04L 12/707* (2013.01)
(Continued)

(52) U.S. Cl.
CPC .............. *H04L 45/02* (2013.01); *H04L 41/08* (2013.01); *H04L 43/0864* (2013.01);
(Continued)

(58) Field of Classification Search
None
See application file for complete search history.

(56) References Cited

U.S. PATENT DOCUMENTS 5,394,503 A 2/1995 Dietz
6,243,510 B1 6/2001 Rauch
(Continued)

FOREIGN PATENT DOCUMENTS

| EP | 1388982 | 2/2004 |
|---|---|---|
| EP | 2341661 | 7/2011 |
| GB | 2350983 | 12/2000 |

OTHER PUBLICATIONS

Notification of Transmittal of The International Search Report and The Written Opinion of the International Searching Authority, or the Declaration, for PCT/US2016/046569, dated Oct. 17, 2016, 12 pages.

(Continued)

*Primary Examiner* — Candal Elpenord
(74) *Attorney, Agent, or Firm* — Invention Mine LLC

(57) ABSTRACT

Presently disclosed are systems and methods for monitoring and managing communication paths in data centers. One embodiment takes the form of a method that includes associating an end-to-end communication path with one or more service-level parameters, where a plurality of PLCCs are interconnected along the end-to-end communication path. The method also includes receiving a low-signal-level indication from at least one PLCC on the communication path, and responsively (i) selecting at least one responsive action based at least in part on the one or more service-level parameters and (ii) taking the at least one selected responsive action with respect to the end-to-end communication path.

18 Claims, 16 Drawing Sheets

Related U.S. Application Data filed on Aug. 12, 2015, provisional application No. 62/204,353, filed on Aug. 12, 2015.

(51) Int. Cl.
   *H04L 12/26* (2006.01)
   *H04L 12/24* (2006.01)
(52) U.S. Cl.
   CPC .......... *H04L 45/22* (2013.01); *H04L 43/0888* (2013.01); *H04L 43/16* (2013.01)

(56) References Cited

U.S. PATENT DOCUMENTS

| | | | | |
|---|---|---|---|---|
| 6,411,598 | B1* | 6/2002 | McGlade | H04J 3/14 370/217 |
| 6,597,826 | B1 | 7/2003 | Ramaswami | |
| 6,728,016 | B1 | 4/2004 | Hunt | |
| 6,834,139 | B1 | 12/2004 | Prairie | |
| 7,215,843 | B2 | 5/2007 | Fukashiro | |
| 7,293,090 | B1* | 11/2007 | Saleh | H04L 43/0817 370/412 |
| 7,315,510 | B1* | 1/2008 | Owens | H04L 12/462 370/218 |
| 7,796,504 | B1* | 9/2010 | Owens | H04L 29/06 370/225 |
| 8,260,133 | B2 | 9/2012 | Li | H04J 14/0284 370/216 |
| 8,289,845 | B1* | 10/2012 | Baldonado | H04L 43/50 370/229 |
| 8,774,232 | B2* | 7/2014 | Smith | H04J 3/0682 370/519 |
| 8,948,005 | B1 | 2/2015 | Gert | |
| 2002/0149815 | A1 | 10/2002 | Schafer | |
| 2003/0097438 | A1 | 5/2003 | Bearden | |
| 2004/0129871 | A1 | 7/2004 | Laberge | |
| 2005/0008284 | A1 | 1/2005 | Chaudhuri | |
| 2010/0293316 | A1 | 11/2010 | Mehrotra | |
| 2011/0170859 | A1 | 7/2011 | Conklin | |
| 2015/0280989 | A1 | 10/2015 | Raza | |

OTHER PUBLICATIONS

International Search Report and Written Opinion for PCT/US2016/046570, dated Nov. 11, 2016, 12 pages.

Bach, R., et al., "Optical Performance Monitoring", Journal of Lightwave Technology, IEEE Service Center, New York, NY US, vol. 22, No. 1, Jan. 1, 2004, pp. 294-304, XP011107635, ISSN: 0733-8724, DOI: 10.1109/ULT.2003.822154.

Flick Hewlett-Packard Company, J., Definitions of Managed Objects for the Ehternet-like Interface Types; rfc3635.txt, Internet X.509, Public Key Infractstructure Certificate and Certificate Revocation List (CRL) Profile; RFC5280.txt, Internet Society (ISOC) 4, Rue De Falaises CH-1205 Geneva Switzerland, CH, Sep. 1, 2003, XP015009417, ISSN: 0000-0003, pages.

Shah, M. Yip, "Extreme Networks S: Extreme Networks' Ethernet Automatic Protection Switching (EAPS) Version 1", 20031001; 20031000, Oct. 1, 2003, XP015009401, 7 pages.

"Ethernet ring protection switching", G.8032/Y.1344 (Jun. 2008):, ITU-T Standard, International Telecommunication Union, Geneva; CH, No. G.8032/Y.1344 (Jun. 2008), Jun. 22, 2008 (Jun. 22, 2008), pp. 1-46, XP017466874, [retrieved on Apr. 30, 2009], Chapter 7-9.

Notification of Transmittal of the International Search Report and The Written Opinion of the International Searching Authority, or the Declaration, for PCT/US2016/046566, dated Nov. 16, 2016, 13 pages.

\* cited by examiner

EXTERNAL-LINK MAPPING TABLE 800

| LINK ID | POINT01 | POINT02 | DIRECTION |
|---|---|---|---|
| ... | ... | ... | ... |
| LINK761 | EP751 | PORT421A | BIDIRECTIONAL |
| LINK762 | EP752 | PORT422A | BIDIRECTIONAL |
| LINK763 | EP753 | PORT423A | BIDIRECTIONAL |
| LINK764 | EP754 | PORT424A | BIDIRECTIONAL |
| LINK765 | PORT428C | EP755 | BIDIRECTIONAL |
| LINK766 | PORT427C | EP756 | BIDIRECTIONAL |
| LINK767 | PORT426C | EP758 | BIDIRECTIONAL |
| LINK768 | PORT425C | EP757 | POINT01→POINT02 |
| ... | ... | ... | ... |
| LINK771 | PORT428A | PORT421B | BIDIRECTIONAL |
| LINK772 | PORT427A | PORT422B | BIDIRECTIONAL |
| LINK773 | PORT426A | PORT423B | POINT01→POINT02 |
| LINK774 | PORT425A | PORT424C | BIDIRECTIONAL |
| ... | ... | ... | ... |
| LINK781 | PORT428B | PORT422C | BIDIRECTIONAL |
| LINK782 | PORT427B | PORT421C | BIDIRECTIONAL |
| LINK783 | PORT426B | PORT423C | POINT01→POINT02 |
| ... | ... | ... | ... |

FIG. 8

INTERNAL-LINK MAPPING TABLE 900

| PLCC | LINK ID | POINT01 | POINT02 | DIRECTION |
|---|---|---|---|---|
| ... | ... | ... | ... | ... |
| PLCC406A | LINK702 | PORT421A | PORT428A | BIDIRECTIONAL |
| PLCC406A | LINK704 | PORT422A | PORT427A | BIDIRECTIONAL |
| PLCC406A | LINK706 | PORT422A | PORT426A | POINT01→POINT02 |
| PLCC406A | LINK708 | PORT424A | PORT425A | BIDIRECTIONAL |
| PLCC406A | LINK710 | PORT421A | PORT429A | POINT01→POINT02 |
| ... | ... | ... | ... | ... |
| PLCC406B | LINK720 | PORT421B | PORT428B | BIDIRECTIONAL |
| PLCC406B | LINK722 | PORT422B | PORT427B | BIDIRECTIONAL |
| PLCC406B | LINK724 | PORT423B | PORT426B | POINT01→POINT02 |
| PLCC406B | LINK726 | PORT424B | PORT425B | BIDIRECTIONAL |
| ... | ... | ... | ... | ... |
| PLCC406C | LINK730 | PORT421C | PORT428C | BIDIRECTIONAL |
| PLCC406C | LINK732 | PORT422C | PORT427C | BIDIRECTIONAL |
| PLCC406C | LINK734 | PORT423C | PORT425C | POINT01→POINT02 |
| PLCC406C | LINK736 | PORT424C | PORT426C | BIDIRECTIONAL |
| ... | ... | ... | ... | ... |

FIG. 9

END-TO-END PATH-MAPPING TABLE 1000

| PATH ID | ENDPOINT 01 | PATH MAP | ENDPOINT 02 | DIRECTION | SERVICE-LEVEL PARAMETERS |
|---|---|---|---|---|---|
| PATH1001 | EP751 | {LINK761, LINK702, LINK771, LINK720, LINK781, LINK732, LINK766} | EP756 | BIDIRECTIONAL | SECURE |
| PATH1002 | EP752 | {LINK762, LINK704, LINK772, LINK722, LINK782, LINK730, LINK765} | EP755 | BIDIRECTIONAL | SECURE MINIMUM THROUGHPUT |
| PATH1003 | EP752 | {LINK762, LINK706, LINK773, LINK724, LINK783, LINK734, LINK768} | EP757 | EP01→EP02 | MINIMUM THROUGHPUT |
| PATH1004 | EP754 | {LINK764, LINK708, LINK774, LINK736, LINK767} | EP758 | BIDIRECTIONAL | SECURE HIGH AVAILABILITY |
| ... | | ... | ... | ... | ... |

FIG. 10

SYSTEMS AND METHODS FOR MONITORING AND MANAGING COMMUNICATION PATHS

CROSS-REFERENCE TO RELATED APPLICATIONS

This application claims the benefit of, and hereby incorporates by reference herein in their respective entireties, the following three U.S. Provisional patent applications: Ser. No. 62/204,344, filed Aug. 12, 2015, entitled "Systems and Methods for Monitoring and Managing Communication Paths;" Ser. No. 62/204,350, filed Aug. 12, 2015, entitled "Systems and Methods for Identifying Interconnections Among Physical-Layer Cross-Connect Switches;" and Ser. No. 62/204,353, filed Aug. 12, 2015, entitled "Physical-Layer Cross-Connect Switch." Furthermore, this application is being filed contemporaneously with two other non-provisional U.S. patent applications, the entire contents of both of which are hereby incorporated herein by reference. The first such application is entitled "Systems and Methods for Identifying Interconnections Among Physical-Layer Cross-Connect Switches," filed Oct. 7, 2015, having Ser. No. 14/877,695. The second such application is entitled "Physical Layer Cross-Connect Switch," filed Oct. 7, 2015, having Ser. No. 14/877,704.

TECHNICAL FIELD

This disclosure relates to digital networking, and more specifically to monitoring and managing dynamically configurable communication paths across a plurality of physical-layer cross-connect switches at, for example, a data center.

BACKGROUND

Stated generally, data centers are facilities that house computers, servers, data-storage systems, networking components, telecommunications equipment, other associated equipment, and the like. In some instances, data centers are operated by companies (e.g., service providers) such as Amazon®, Google®, Facebook®, and the like, which may, among other functions, provide one or more data feeds from a given data center. In some instances, data centers are operated as distribution centers for telecommunications services, data services, and the like for one or more buildings, campuses, communities, and the like. And certainly other example uses of data centers could be listed here.

Among the many operations that are carried out at typical data centers, one common example is what is known as physical-layer (i.e., layer-1) switching, which is carried out by one or more devices often known and referred to herein as physical-layer switches, which are devices that provide physical connections between various different instances of networking equipment. As examples, a given data center may receive data feeds from and/or have connections with one or more service providers, Internet Service Providers (ISPs), and the like, and use one or more physical-layer switches to connect those received data feeds and/or other data connections to some number of servers, computing devices, and the like. And certainly numerous other example data-center operations and arrangements could be listed here.

Prior implementations incorporated what are known in the relevant art as patch panels, which, in a typical arrangement, include a back panel and a front panel that each include a number of data (e.g., RJ-45) jacks, which are physical electrical interfaces into which cables (e.g., Ethernet cables) equipped with compatible connectors can be removably connected. It is noted that, as used herein, the term "Ethernet cable" refers to any data cable via which data such as Ethernet packets can be transmitted, where one common example of an Ethernet cable is what is known in the art as a Category 6 (or Cat 6) cable. Typically, the various data jacks on the back panel would be respectively connected—on a substantially static, though certainly changeable basis—to various data feeds, data-service connections, computing devices, offices (i.e., data jacks installed in various different offices), and the like. The front panel could then be used to manually establish physical data connections between the various data feeds, data connections, services, computing devices, offices, and the like by using patch (e.g., Ethernet) cables to interconnect various pairs of data jacks on the front panel. Moreover, it was not (and is not) uncommon for larger facilities to use multiple patch panels. It is further noted that, in additional to electrical patch panels, optical patch panels have been used in various different implementations as well.

Physical-layer switches have evolved, and are now often implemented as devices that are typically known as cross-connect (or crossbar) switches. In this disclosure, such switches are referred to as physical-layer cross connects (PLCCs). Each PLCC includes a set of internal data ports among which data connections—be they electrical, optical, or otherwise—can be dynamically configured. Using electrical connections by way of illustration, these internal, dynamically connectable data ports are typically wired on a static, one-to-one basis to respective (externally accessible) data jacks, such that the data jacks then become dynamically connectable to one another by virtue of the dynamic connectability of the internal data ports. Furthermore, multiple PLCCs can be connected to one another—that is, a data jack on one PLCC can be connected (by, e.g., an Ethernet cable) to a data jack on another PLCC, and so on. This expands the number of options for establishing communication paths between and among various endpoints such as computers, servers, and the like. Moreover, a communication-path-management controller can be used to dynamically provision and to a certain extent manage communication paths across multiple PLCCs.

OVERVIEW OF DISCLOSED EMBODIMENTS

Presently disclosed are systems and methods for monitoring and managing communication paths in data centers.

One embodiment takes the form of a method that includes associating an end-to-end communication path with one or more service-level parameters, where a plurality of PLCCs are interconnected along the end-to-end communication path. The method also includes receiving a low-signal-level indication from at least one PLCC on the communication path, and responsively (i) selecting at least one responsive action based at least in part on the one or more service-level parameters and (ii) taking the at least one selected responsive action with respect to the end-to-end communication path.

Another embodiment takes the form of a communication-path-management controller that includes a data-communication interface configured to communicate with a plurality of PLCCs that are interconnected along an end-to-end communication path, a processor, and data storage containing instructions executable by the processor for causing the communication-path-management controller to carry out a set of functions, where the set of functions includes the method steps that are recited in the preceding paragraph.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, the method further includes establishing the end-to-end communication path at least in part by transmitting path-configuration commands to the respective PLCCs in the plurality of PLCCs.

In at least one embodiment, receiving the low-signal-level indication includes receiving the low-signal-level indication via a respective signal-bus connection with the at least one PLCC on the communication path.

In at least one embodiment, the one or more service-level parameters includes a secure-path parameter. In at least one such embodiment, the at least one selected responsive action includes storing a secure-path-fault indication. In at least one such embodiment, the at least one selected responsive action includes presenting a secure-path-fault alert via a user interface.

In at least one embodiment, the one or more service-level parameters includes a high-availability parameter. In at least one such embodiment, the at least one selected responsive action includes storing a high-availability-fault indication. In at least one such embodiment, the at least one selected responsive action includes presenting a high-availability-fault alert via a user interface.

In at least one embodiment, the one or more service-level parameters includes a minimum-throughput parameter. In at least one such embodiment, the at least one selected responsive action includes storing a minimum-throughput-fault indication. In at least one such embodiment, the at least one selected responsive action includes presenting a minimum-throughput-fault alert via a user interface.

In at least one embodiment, the at least one selected responsive action includes transmitting, to at least one of the PLCCs in the plurality of PLCCs, a disable-path command to disable the end-to-end communication path.

In at least one embodiment, the at least one selected responsive action includes rerouting the end-to-end communication path at least in part by transmitting respective routing-reconfiguration commands to one or more of the PLCCs in the plurality of PLCCs. In at least one such embodiment, rerouting the end-to-end communication path further includes (i) determining an alternate route for the end-to-end communication path among the PLCCs in the plurality of PLCCs and (ii) selecting the one or more respective routing-reconfiguration commands based at least in part on the determined alternate route. In at least one such embodiment, the one or more service-level parameters includes a high-availability parameter, the method further includes predetermining a reserved backup route for the end-to-end communication path, and rerouting the end-to-end communication path includes rerouting the end-to-end communication path along the predetermined reserved backup route; in at least one such embodiment, predetermining the reserved backup route for the end-to-end communication path includes predetermining the reserved backup route for the end-to-end communication path responsive to receiving a reserve-path instruction via a user interface.

In at least one embodiment, the plurality of PLCCs that are interconnected along the end-to-end communication path includes a first-end PLCC and a second-end PLCC, the one or more service-level parameters includes a maximum-latency parameter, and the method further includes (i) determining a latency measurement for the end-to-end communication path at least in part by communicating with the first-end PLCC and the second-end PLCC and (ii) identifying a maximum-latency fault condition based at least in part on the determined latency measurement and at least in part on the maximum-latency parameter, and responsively taking at least one latency-mitigation action with respect to the end-to-end communication path. In at least one such embodiment, the at least one latency-mitigation action includes (i) identifying an alternate path that has a current latency measurement that would not exceed the maximum-latency parameter and (ii) rerouting the end-to-end communication path along the identified alternate path.

BRIEF DESCRIPTION OF THE DRAWINGS

FIG. 8 depicts a first data table, in accordance with at least one embodiment.

FIG. 9 depicts a second data table, in accordance with at least one embodiment.

FIG. 10 depicts a third data table, in accordance with at least one embodiment.

Moreover, before proceeding with this disclosure, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in the below detailed description of the drawings.

DETAILED DESCRIPTION

Figure 1:
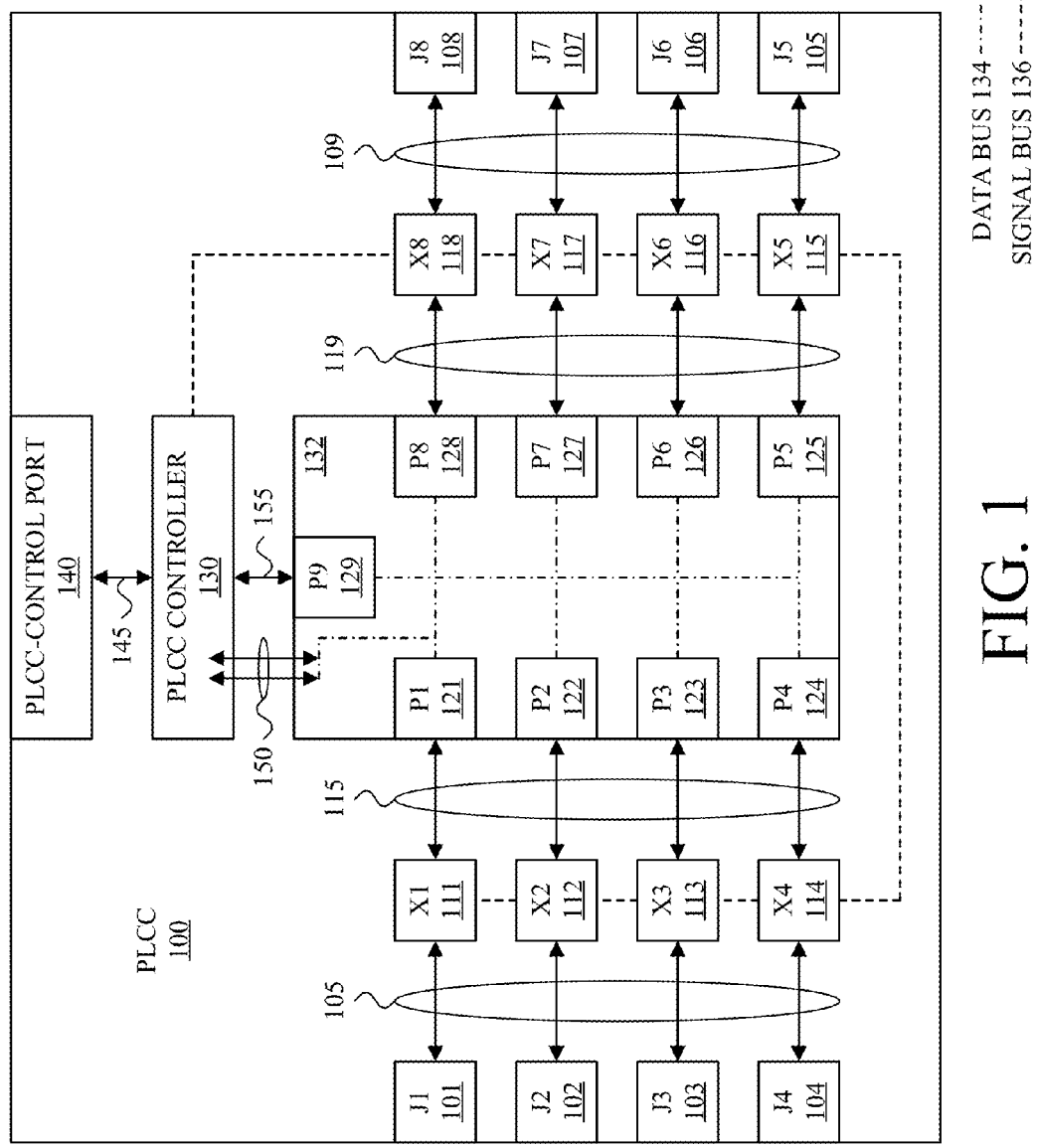
FIG. 1 depicts a first view of an example PLCC, in accordance with at least one embodiment.

FIG. 1 depicts a first view of an example PLCC, in accordance with at least one embodiment. In particular, FIG. 1 depicts an example PLCC 100 that includes data jacks 101-108, transceivers 111-118, data ports 121-129, a PLCC controller 130, a switching circuit 132, a data bus 134, a signal bus 136, a PLCC-control port 140, and a routing bus 150. The PLCC 100 further includes bidirectional communication links 105, 109, 115, 119, 145, and 155. As indicated in the legend that appears in the lower-right-hand corner of FIG. 1, the data bus 134 is represented using a dotted-and-dashed line, while the signal bus 136 is represented using a dashed line. This convention for data-bus depiction and signal-bus depiction continues throughout the drawings, as does a routing-bus-depiction convention of using a parallel pair of double-ended arrows. As a general matter, it will be appreciated by those of skill in the art that the depicted-and-described architecture of the PLCC 100 is presented here by way of example, and that other architectures could be implemented as deemed suitable by those of skill in the art.

It should also be understood that, while eight sets of data jacks and data transceivers, along with nine data ports, are depicted in the PLCC 100, this is purely by way of example and not limitation, as any number of such sets could be implemented as deemed suitable in a given context by those of skill in the relevant art. Indeed, in some embodiments, the PLCC 100 includes many more than nine data ports in total and includes among those many data ports more than one internal-only data port, of which the herein-described data port 129 is an example. As but one example of this scale of PLCC, some embodiments involve PLCCs that each have on the order of 1000 (e.g., 1024) data ports, among which are included on the order of 32 internal-only data ports. And certainly numerous other examples could be listed here as well.

Returning to the embodiment that is depicted in FIG. 1, each of the data jacks 101-108 is an RJ-45 data jack, configured to removably receive a conventional RJ-45 connector on one end of an Ethernet cable. In other embodiments, other data-transmission technologies such as fiber optics are used; in such embodiments, the cables, connectors, and the like are selected to be suitable for the particular data-transmission technology. Each data jack 101-108 includes both transmit (i.e., outbound) and receive (i.e., inbound) connections. Moreover, each data jack 101-108 is connected by way of a respective bidirectional communication link (e.g., wiring and/or other circuitry) 105, 109 to a respective one of the transceivers 111-118, each of which includes the appropriate components (e.g., circuitry) for independently conveying physical-layer signals (e.g., data packets (e.g., Ethernet packets)) in both the transmit and receive directions.

In at least one embodiment, each transceiver 111-118 further includes an electrical connection to the signal bus 136, as well as at least one signal-level sensor configured to be able to measure a signal level (e.g., a signal-to-noise ratio (SNR)) of a signal at the corresponding transceiver 111-118. Each transceiver 111-118 is also able to convey data representative of that signal-level measurement via the signal bus 136 to the PLCC controller 130.

Additionally, in some embodiments, each transceiver 111-118 can be toggled on and off (e.g., with respect to its transmit capability, with respect to its power as a whole, between a power-save mode and an active mode, and/or the like) by way of control signals sent via the signal bus 136. As examples, such a mechanism may take the form of a transmit-disable pin, a power-up and power-down function presented as a single control pin or as multiple control pins. Signals received via such pins may cause the respective transceivers to responsively store pin-high or pin-low values in various control registers that effect control of such functions in the transceivers by way of an internal control bus such as an $I^2C$ bus, as is known in the art.

Moreover, each transceiver 111-118 may provide the ability (via, e.g., one or more register-and-pin combinations) to be polled via the signal bus 136 with respect to various transceiver states such as a receive-signal-loss state (where a 1 may indicate a loss of a receive signal and a 0 may complementarily indicate a presence (i.e., lack of loss) of a receive signal), a power-off state, a power-on state, and/or the like. Furthermore, the various transceivers 111-118 may be arranged to push some or all of such state-indication values via the signal bus 136 to the PLCC controller 130. Whether such values are pushed or pulled (by the PLCC controller 130 or by an upstream entity such as a server or other controller via the PLCC controller 130), the PLCC controller 130 may communicate such values via the PLCC-control port 140 to one or more upstream entities. And certainly numerous other example implementations could be listed.

Furthermore, each transceiver 111-118 is connected via a respective bidirectional communication link (e.g., wiring and/or other circuitry) 115, 119 to a respective data port 121-128. Thus, it can be appreciated that, by way of the bidirectional communication links 105, 109, 115, and 119, each (external) data jack 101-108 has a one-to-one, bidirectional communicative relationship with a respective (internal) data port 121-128 via a respective transceiver 111-118.

As is explained more fully below, the dynamically configurable nature of the data bus 134, and thus of the connectivity between and among the various internal data ports 121-129, enables each of the external data jacks 101-108 to be communicatively connected to any other. Additionally, as is also described below, any dynamically selected one of the data ports 121-128 can be connected—in either or both of the transmit and receive directions—with the PLCC controller 130 by way of the dynamically configurable data bus 134 and via the internal-only data port 129 (i.e., the PLCC-controller data port 129). In the depicted embodiments, the PLCC controller 130 transmits path-configuration commands via the routing bus 150 to dynamically configure the connections among the data ports 121-129 via the data bus 134. In at least one embodiment, at least some such path-configuration commands are generated by the PLCC controller 130. In at least one embodiment, at least some such path-configuration commands are relayed by the PLCC controller 130 on behalf of one or more upstream entities.

Furthermore, as is the case with each of the data jacks 101-108 and each of the transceivers 111-118, each of the data ports 121-129 is bidirectional. Thus, each such data port 121-129 includes connections to facilitate both transmission of outbound data and reception of inbound data, where such transmission and reception can—but need not—occur simultaneously. Each data port 121-129 can independently receive data from any other data port 121-129 (i.e., from any one of the data ports 121-129 other than itself) and transmit data to any one or more of the other data ports 121-129 (i.e., to any one or more of the data ports 121-129 other than itself). In the case of one-to-multiple (a.k.a. one-to-many) transmission, the data transmitted from a given one of the data ports 121-129 to each of the multiple other data ports 121-129 would be the same data (i.e., mirrored copies of a given sequence of data).

The PLCC-controller data port 129, then, can receive a mirrored copy of the data that any data port 121-128 is transmitting to any other data port 121-128. And in a simpler case, the data port 129 can be configured to simply receive— i.e., to be the only data port that receives—whatever data is being received via any of the data ports 121-128 (i.e., whatever inbound data is being received via any of the data ports 121-128 via their respective transceiver 111-118 and data jack 101-108). Either way, then, the PLCC controller 130 (and/or one or more upstream entities) can monitor inbound data that is coming in via any of the data ports 121-128 via the data bus 134, the PLCC-controller data port 129, and the communication link 155. On the transmit side, the data bus 134 can be configured such that the PLCC controller 130 (and/or one or more upstream entities via the PLCC controller 130) can cause any data sequences they want to be transmitted out, by way of the PLCC-controller data port 129 and the data bus 134, via any one or more of the data ports 121-128 (and thus transmitted out via any one or more of the data jacks 101-108 via respective transceivers 111-118).

The switching circuit 132 includes the data ports 121-129 as well as the data bus 134, which communicates with the PLCC controller 130 via the routing bus 150. As described above, the PLCC controller 130 can also engage in bidirectional communication over the data bus 134 via the communication link 155 and the PLCC-controller data port 129. And as was also stated previously, the PLCC controller 130 has a connection with the signal bus 136. The PLCC controller 130 could be or include any suitable programmed and/or programmable logic circuit (e.g., microprocessor, field programmable gate array (FPGA), and/or the like). Moreover, the PLCC controller 130 is connected to the PLCC-control port 140 by the communication link (e.g., wiring and/or other circuitry) 145. The PLCC-control port 140 may include any necessary hardware, communication interface(s), and operational logic for carrying out functions including receiving data (e.g., commands) from one or more entities external to the PLCC 100, sending data to one or more such entities, and communicating with the PLCC controller 130. Further aspects and uses of the example PLCC 100 are discussed below.

Figure 2:
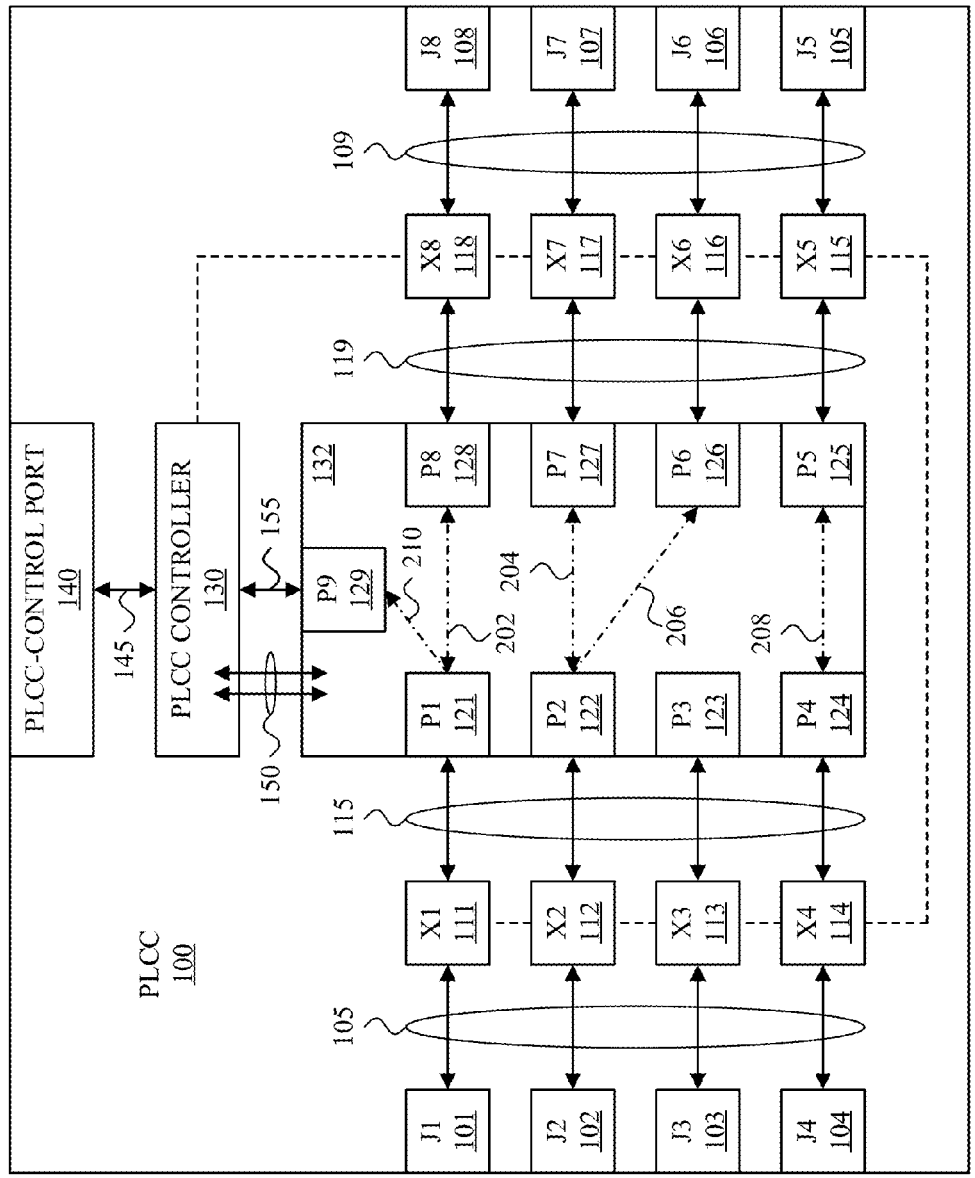
FIG. 2 depicts a second view of the example PLCC of FIG. 1, in accordance with at least one embodiment.

FIG. 2 depicts a second view of the example PLCC of FIG. 1, in accordance with at least one embodiment. As stated above, the PLCC controller 130, perhaps responsive to receiving configuration commands via the PLCC-control port 140, is operable to dynamically configure data connections among the various data ports 121-129. In the example configuration that is depicted in FIG. 2, the following data connections have been dynamically configured: a bidirectional connection 202 between the data ports 121 and 128 (and thus between the data jacks 101 and 108), a bidirectional connection 204 between the data ports 122 and 127 (and thus between the data jacks 102 and 107), a unidirectional port-output-mirroring connection 206 from the data port 122 to the data port 126 (mirroring inbound data received via the data jack 102 for output of a copy of that data via the data jack 106), a bidirectional connection 208 between the data ports 124 and 125 (and thus between the data jacks 104 and 105), and a unidirectional port-output-mirroring connection 210 from the data port 121 to the PLCC-controller data port 129 (mirroring inbound data received via the data jack 101 for transmission of a copy of that data to the PLCC controller 130 by way of the PLCC-controller data port 129 and the communication link 155, perhaps for conducting a monitoring function, a packet-sniffing function, a connection-discovery function (as is described more fully below), and/or one or more other functions).

The use of the dotted-and-dashed lines for the connections 202-210 in FIG. 2 are meant to indicate that these connections make use of the data bus 134. It is to be understood that a bidirectional connection is present between the PLCC controller 130 and the data bus 134 by way of the routing bus 150 whether or not the connectivity between the data bus 134 and the routing bus 150 is explicitly shown in a given figure. This connection is explicitly shown in FIGS. 1 and 4 but is not explicitly shown in FIGS. 2, 3, and 7, where those latter-mentioned three figures are those that depict particular mappings among the internal data ports, and where showing the explicit connection between the data bus 134 and the routing bus 150 would obscure the presentation of those particular mappings. It is further noted that, regardless of the particular configured routing among the data ports 121-129, the PLCC controller 130 maintains a connection with the various transceivers 111-118 via the signal bus 136. Moreover, it is noted that the example configuration that is depicted in FIG. 2 involving the example data connections 202-210 is provided purely by way of example and not limitation, as numerous other mappings among the data ports 121-129 could be dynamically configured. This example configuration of the example PLCC 100 is, however, used in further examples in the balance of this disclosure to aid in illustrating various example scenarios.

Figure 3:
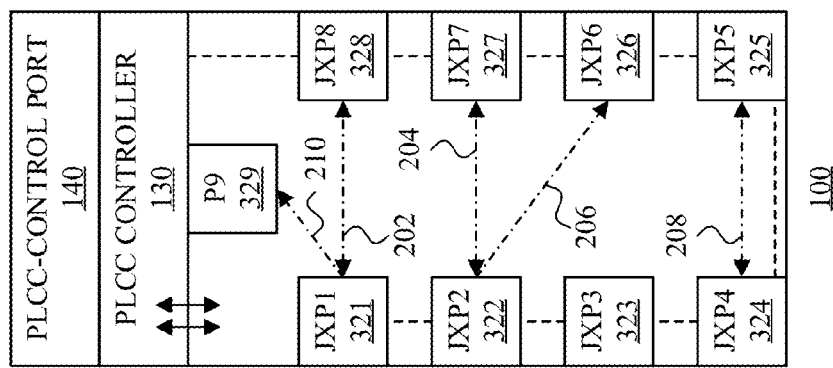
FIG. 3 depicts a third view of the example PLCC of FIG. 1, in accordance with at least one embodiment.

FIG. 3 depicts a third view of the example PLCC of FIG. 1, in accordance with at least one embodiment. Essentially, FIG. 3 depicts a compressed view of the example PLCC 100 of FIG. 1 in the same connection-mapped configuration (involving the data connections 202-210) that is depicted in FIG. 2. Each of the eight sets of corresponding (external) data jack, transceiver, and (internal, dynamically configurable) data port—depicted as separate components in FIGS. 1 and 2—has been compressed into a single element for efficiency of display in FIG. 3. For example, the FIG. 1 and FIG. 2 elements of the data jack 101 (J1), the transceiver 111 (X1), and the data port 121 (P1) have been compressed into a single element, which is referred to herein as the port 321 (and is labeled JXP1). This compressed view is presented in FIG. 3 to aid the reader in understanding some of the ensuing figures in which multiple PLCCs are utilized. It is further noted that the internal-only PLCC-controller port P9, which is numbered 129 in each of FIG. 1 and FIG. 2, needed no such compression, and has simply been renumbered 329 to match the 300-series numbering of FIG. 3.

Figure 4:
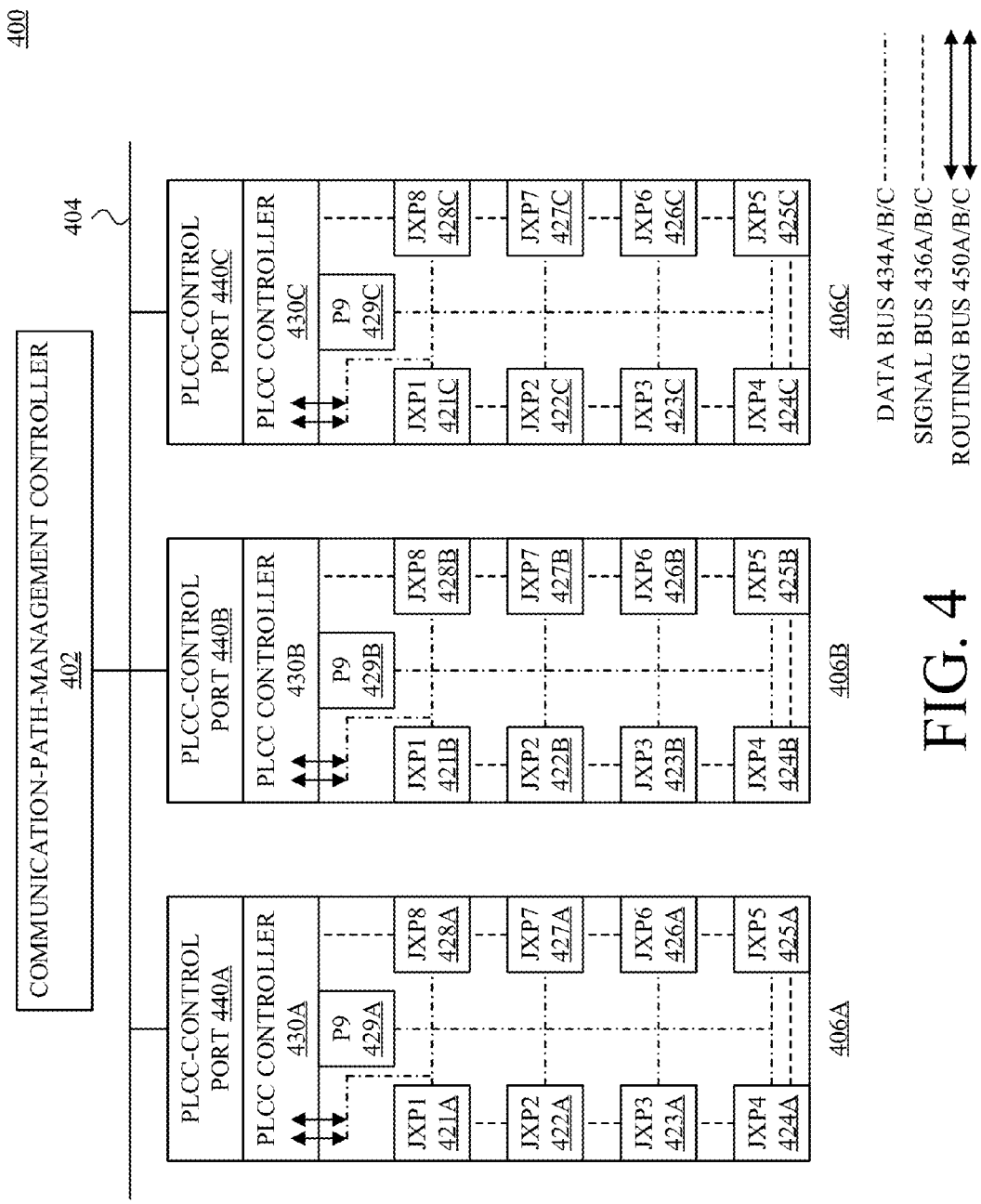
FIG. 4 depicts a first view of an example communication-path-management system that includes an example communication-path-management controller and multiple PLCCs similar to the example PLCC of FIG. 1, in accordance with at least one embodiment.

FIG. 4 depicts a first view of an example communication-path-management system that includes an example communication-path-management controller and multiple PLCCs similar to the example PLCC of FIG. 1, in accordance with at least one embodiment. In particular, FIG. 4 depicts an example communication-path-management system 400 that includes a communication-path-management controller 402, a system bus 404, and three PLCCs 406A, 406B, and 406C.

The communication-path-management controller 402 is discussed more fully in connection with the ensuing figures, but in general may take the form of any programmed and/or programmable logic circuit that is configured to carry out various functions described herein, and may include (i) a microprocessor, an FPGA, and/or the like, (ii) a communication interface for sending and receiving data on the system bus 404, and (iii) data storage containing instructions executable (by the aforementioned microprocessor, FPGA, and/or the like) for carrying out various functions described herein.

Moreover, each of the PLCCs 406A-C has a structure similar to that described in the previous figures, and each is numbered using the numbering convention of FIG. 3, though updated to the 400-series numbering of FIG. 4. Moreover, it is noted that FIG. 4 depicts the example communication-path-management system 400 without any particular dynamic connections having been set up among the ports of any of the PLCCs 406A-C, and without any data connections (e.g., Ethernet cables) having been established between any two or more of the PLCCs 406A-C. This is purely for simplicity of explanation and not by way of limitation. Also, it is noted that the PLCCs 406A-C could be situated in a given data center, but could also be situated at different geographical locations across a given country or in multiple countries. Moreover, the system bus 404 could include any types of data-communication links that are suitable for the distance across which the data communication needs to take place.

Figure 5:
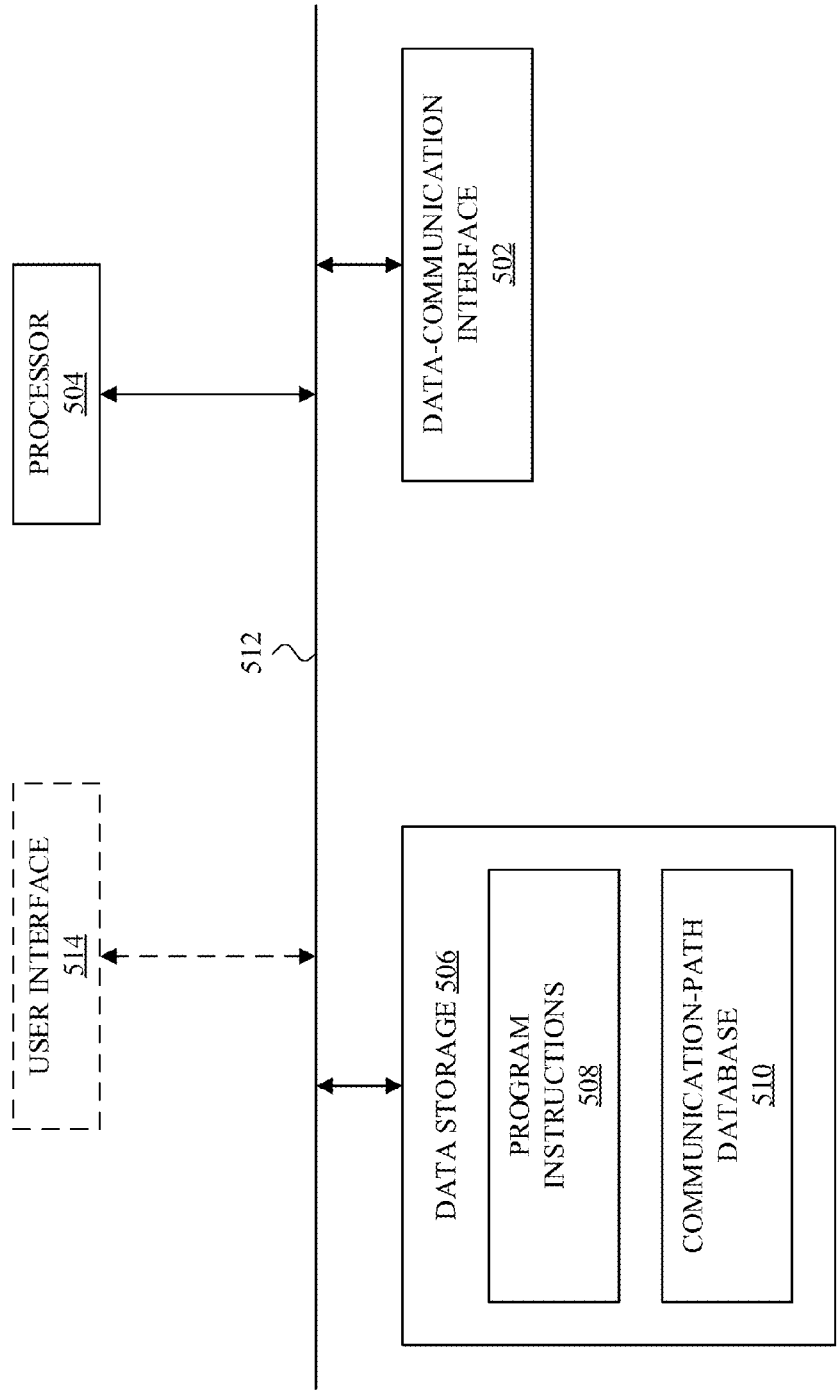
FIG. 5 depicts an example structure of the example communication-path-management controller of FIG. 4, in accordance with at least one embodiment.

FIG. 5 depicts an example structure of the example communication-path-management controller of FIG. 4, in accordance with at least one embodiment. In particular, FIG. 5 depicts the communication-path-management controller 402 as including a data-communication interface 502, a processor 504, and a data storage 506, all of which are communicatively coupled by a system bus 512. It will be understood by those of skill in the relevant art that the structure that is presented in FIG. 5 is provided by way of example and not limitation, and that other structures could be implemented as deemed suitable by those of skill in the art in different contexts. As will be discussed further below, the communication-path-management controller 402 is also depicted as optionally having a user interface 514; the optional nature of this component is indicated in FIG. 5 using dashed lines both for the component itself and for its connection to system bus 512.

The data-communication interface 502 may take the form of any communication-interface circuitry (e.g., custom, USB, Ethernet, and/or the like) deemed suitable for a given implementation by those of skill in the relevant art. The data-communication interface 502 may be configured to communicate via the system bus 404 with multiple PLCCs such as the three PLCCs 406A-C that are depicted by way of example in FIG. 4. In various different embodiments and scenarios, and as is further discussed below, the multiple PLCCs with which the communication-path-management controller 402 is configured to communicate via the data-communication interface 502 may be interconnected (using, e.g., Ethernet cables) to facilitate one or more end-to-end communication paths.

The processor 504 may include one or more processors of any type deemed suitable by those of skill in the relevant art, some examples including a general-purpose microprocessor, an FPGA, and a dedicated digital signal processor (DSP). The data storage 506 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. The data storage 506 contains program instructions 508 that are executable by the processor 504 for carrying out various functions described herein. In at least one embodiment, the data storage 506 also contains a communication-path database 510, which is discussed below.

If present, the user interface 514 may include one or more input devices (a.k.a. components and the like) and/or one or more output devices (a.k.a. components and the like). With respect to input devices, the user interface 514 may include one or more touchscreens, keyboards, mice, trackpads, buttons, switches, knobs, microphones, and the like. With respect to output devices, the user interface 514 may include one or more displays, speakers, light emitting diodes (LEDs), and the like. Moreover, one or more components (e.g., an interactive touchscreen-and-display component) of the user interface 514 could provide both user-input and user-output functionality. And certainly other user-interface components could be used in a given context, as known to those of skill in the art.

Figure 6:
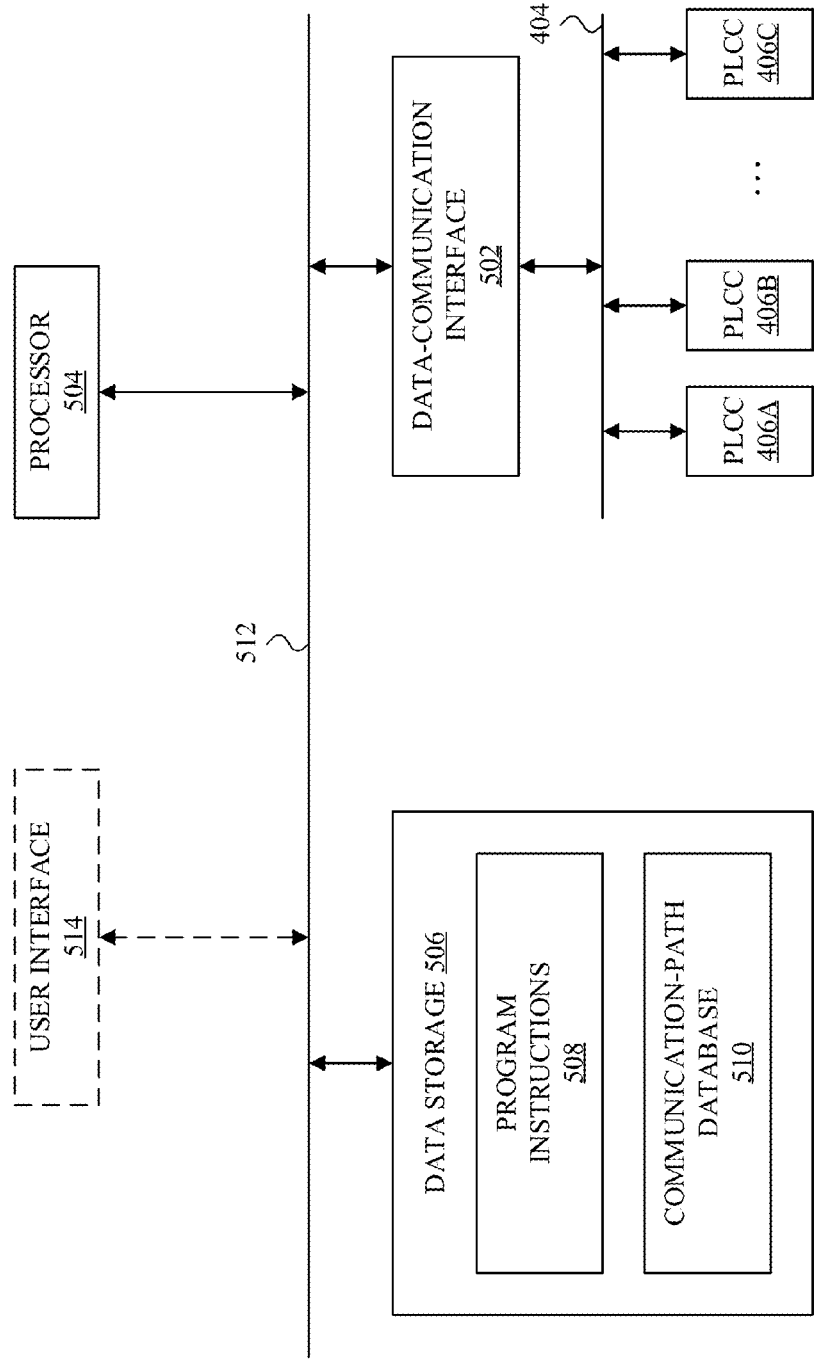
FIG. 6 depicts a second view of the example communication-path-management system of FIG. 4, in accordance with at least one embodiment.

FIG. 6 depicts a second view of the example communication-path-management system of FIG. 4, in accordance with at least one embodiment. Essentially, FIG. 6 is a combination of sorts of FIGS. 4 and 5, simply showing the interconnection between (i) the communication-path-management-controller 402 structure that is depicted in FIG. 5 and (ii) the remainder of the communication-path-management system 400 that is depicted in FIG. 4. Due to the similarity of FIG. 6 with FIGS. 4 and 5, FIG. 6 is not discussed here in as great of detail. One slight difference between FIG. 4 and FIG. 6 is that the ellipses in FIG. 6 between the PLCCs 406B and 406C are present to illustrate that any number (even fewer than three) of PLCCs could be present in various different implementations.

Figure 7:
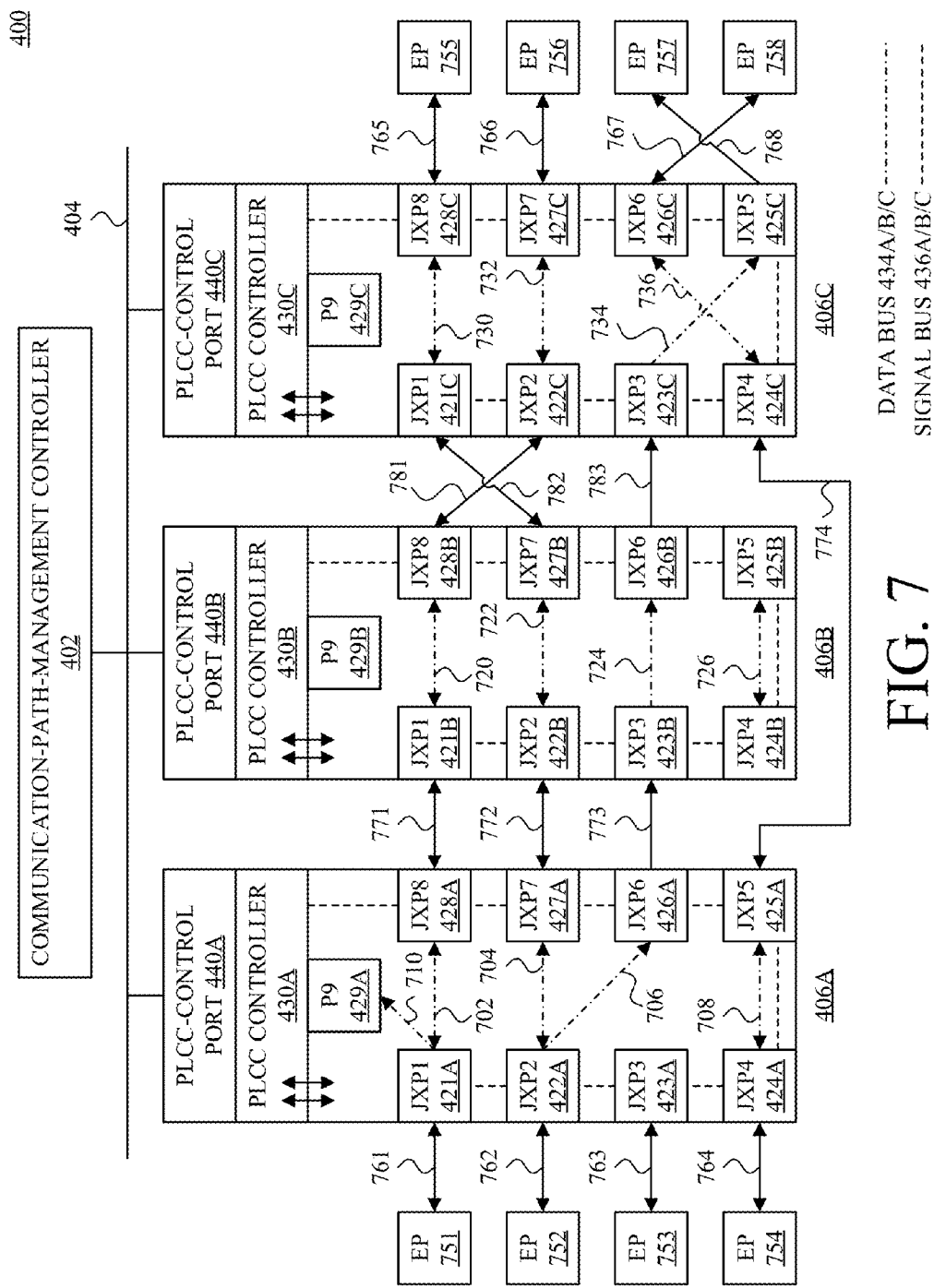
FIG. 7 depicts a third view of the example communication-path-management system of FIG. 4, in accordance with at least one embodiment.

FIG. 7 depicts a third view of the example communication-path-management system of FIG. 4, in accordance with at least one embodiment. FIG. 7 is essentially an extension of FIG. 4 with several notable differences. First, FIG. 7 includes endpoints 751-758, each of which could take the form of any suitable computing-and-communication device having a compatible communication interface (e.g., an Ethernet interface). It should be noted that at least one system embodiment includes the endpoints 751-758 and at least one system embodiment does not. The endpoints 751-758 are respectively connected to various ports of the PLCCs 406A and 406C by respective communication links 761-768, each of which may take the form of an Ethernet cable. Second, FIG. 7 includes communication links 771-774 and 781-783, each of which may take the form of an Ethernet cable. Third, the respective data buses 436A-C of the respective PLCCs 406A-C have been mapped in various different ways by way of path-configuration commands being sent over the system bus 404 from the communication-path-management controller 402 to the respective PLCCs 406A-C.

With respect to the PLCC 406A, the ports 421A-424A of the PLCC 406B are respectively connected via the communication links 761-764 to the respective endpoints 751-754. Also, the ports 428A-426A are respectively connected to the ports 421B-423B of the PLCC 406B via the communication links 771-773. The port 425A of the PLCC 406A is connected via the communication link 774 to the port 424C of the PLCC 406C. Internally, the ports of the PLCC 406A have the same connections—though numbered in the 700 series instead of the 200 series—as the connections 202-210 that are shown in the example PLCC 100 in FIGS. 2 and 3. In the depicted example, the communication links 702, 704, 708, 761-764, 771, 772, and 774 are bidirectional, whereas the communication links 706, 710, and 773 are unidirectional.

With respect to the PLCC 406B, the external communication links include the communication links 771-773 as well as the bidirectional link 781 between the port 428B of the PLCC 406B and the port 422C of the PLCC 406C, the bidirectional link 782 between the port 427B of the PLCC 406B and the port 421C of the PLCC 406C, and the unidirectional link 783 from the port 426B of the PLCC 406B to the port 423C of the PLCC 406C. Internal to the PLCC 406B, the above-referenced configuration commands from the communication-path-management controller 402 have mapped a bidirectional connection 720 between the port 421B and the port 428B, a bidirectional connection 722 between the port 422B and the port 427B, a unidirectional connection 724 from the port 423B to the port 426B, and a bidirectional connection 726 between the port 424B and the port 425B.

Moreover, it is noted that, although a port-mirroring arrangement (to the PLCC controller 430B via the internal-only PLCC-controller data port 429B) could be configured from any of the ports 421B-428B (other than the port 426B, which, as depicted, has no output on the data bus 434B that could be mirrored), no such port-mirroring arrangement is depicted in the PLCC 406B in FIG. 7. Stated more generally, while it is the case that a unidirectional or bidirectional connection could be established between the PLCC-controller port 429B and one or more of the data ports 421B-428B (keeping in mind that each data port 421B-429B can transmit to multiple other data ports 421B-429B at once but can only receive from one other data port 421B-429B at any one time), it is simply the case that no such connection is depicted in the PLCC 406B in the example arrangement that is shown in FIG. 7.

With respect to the PLCC 406C, the external communication links are the above-mentioned communication links 774, 781-783, and 765-768. Among the latter group, the communication links 765-767 are bidirectional whereas the communication link 768 is unidirectional from the port 425C to the endpoint 757. Internal to the PLCC 406C, the above-referenced configuration commands from the communication-path-management controller 402 have mapped a bidirectional connection 730 between the port 421C and the port 428C, a bidirectional connection 732 between the port 422C and the port 427C, a unidirectional connection 734 from the port 423C to the port 425C, and a bidirectional connection 736 between the port 424C and the port 426C.

Moreover, it is noted that, although a port-mirroring arrangement (to the PLCC controller 430C via the internal-only PLCC-controller data port 429C) could be configured from any of the ports 421C-428C (other than the port 425C, which, as depicted, has no output on the data bus 434C that could be mirrored), no such port-mirroring arrangement is depicted in the PLCC 406C in FIG. 7. More generally stated, while it is the case in general that a unidirectional or bidirectional connection could be established between the PLCC-controller port 429C and one or more of the data ports 421C-428C (keeping in mind that each data port 421C-429C can transmit to multiple other data ports 421C-429C at once but can only receive from one other data port 421C-429C at any one time), it is simply the case that no such connection is depicted in the PLCC 406C in the example arrangement that is shown in FIG. 7.

FIG. 8 depicts a first data table, in accordance with at least one embodiment. In particular, FIG. 8 depicts an external-link mapping table 800 that, in at least one embodiment, is stored by the communication-path-management controller 402 in the communication-path database 510. The external-link mapping table 800 reflects the arrangement that is depicted in—and described above in connection with—FIG. 7; indeed, the external-link mapping table 800 shows a data-organization approach that the communication-path-management controller 402 could use to keep track of the external data-communication links that are depicted in FIG. 7. This arrangement is provided by way of example and not limitation, as other manners of organizing this sort of data could certainly be used.

As used in this context, the term "external data-communication links" refers to those data-communication links that are external to the PLCCs 406A-C—i.e., those data-communication links that extend either (i) between one of the PLCCs 406A-C and one of the endpoints 751-758 or (ii) between two of the PLCCs 406A-C. Moreover, it is noted that it is certainly possible that an external communication link could extend from one port of a given PLCC to another port of the same PLCC, though this is unlikely to be implemented due to the relative increase in link speed that could be realized by instead mapping an intra-PLCC connection between the same two ports via the respective data bus of the respective PLCC.

As can be seen in FIG. 8, the external-link mapping table 800 has four columns that, for each link identified in a given row, respectively provide a link ID that matches the reference numbering used in FIG. 7, a first point of the given link ("Point 01"), a second point of the given link ("Point 02"), and an indication of whether the given link is bidirectional, unidirectional from the respective Point 01 of that link to the respective Point 02 of that link, or unidirectional from the respective Point 02 of that link to the respective Point 01 of that link. Moreover, it is noted that additional data columns could be present as well. As but one example, the external-link mapping table 800 could also include a column in which a most recent measurement (or an average of some number of most recent measurements) of the latency across the corresponding link could be stored. And certainly numerous other examples could be listed here as well.

In at least one embodiment, the external-link mapping table 800 is populated manually by users at, for example, a data center at which these physical connections are present. In at least one embodiment, the external-link mapping table 800 is populated—at least in part—in an automated manner using what is referred to in this disclosure as a connection-discovery process. Several different options for connection-discovery processes are discussed below in the balance of this description of FIG. 8, and also below in connection with FIGS. 13 and 14.

Various different connection-discovery processes are referred to in this disclosure as being either intrusive or non-intrusive. In the parlance of this disclosure, intrusive connection-discovery processes are those during which the normal flow of data through and among the various PLCCs cannot occur, in some cases because a given intrusive connection-discovery process involves sending data (e.g., PLCC-and-port identifiers)—between the various ports of the various PLCCs—that would not otherwise be sent, in other cases because a given intrusive connection-discovery process involves causing and detecting various power-cycling patterns with respect to the various transceivers of the various PLCCs, rendering those transceivers temporarily unavailable to do their part in facilitating the normal flow of data. Conversely, in the parlance of this disclosure, non-intrusive connection-discovery processes are those that do not interrupt—and in fact rely on—the normal flow of data through and among the various PLCCs.

In this disclosure, two intrusive connection-discovery processes and one non-intrusive connection-discovery process are discussed, though certainly each of those are described herein as being able to be conducted in a variety of different ways, and certainly each could be adjusted and varied in myriad additional ways by those of skill in the relevant art. The two intrusive connection-discovery processes are referred to herein as the data-based intrusive connection-discovery process and the power-based intrusive connection-discovery process. By way of example and not limitation, the various connection-discovery processes are described in the context of FIGS. 1-7.

In the data-based intrusive connection-discovery process, the communication-path-management controller 402 transmits commands to cause the various PLCCs 406A-C to (i) transmit signature sequences of data from various ports and (ii) report (back to the communication-path-management controller 402) receipt of signature sequences of data at various ports, and thereby construct a mapping of connections such as the connection 782 between the port 427B and the port 421C. The communication-path-management controller 402 may cause the various PLCCs 406A-C to take turns being the only PLCC that is transmitting such identifiers while the other PLCCs only listen, or may instead cause the various PLCCs 406A-C to all simultaneously be (i) transmitting their PLCC-and-port identifiers out of their respective ports and (ii) monitoring the receive components of their respective ports for receipt of any such identifiers. And certainly other example implementations could be listed as well.

Narrowing down the focus for a moment on what one of the PLCCs—namely the PLCC 406B—does during its turn as the transmitter in a one-by-one implementation or in parallel with the other PLCCs during a simultaneous implementation, the PLCC 406B (at the instruction of the communication-path-management controller 402) takes turns transmitting outbound from each of its externally connected ports (i.e., the ports 421B-423B and 426B-428B) particular respective data sequences that identify both the PLCC 406B and the particular port via which the PLCC 406B is transmitting at that time. The PLCC 406B may do this by one by one, perhaps in a round-robin fashion: first establishing a transmit connection from the PLCC-controller port 429B to the port 421B to transmit an identifier such as [406B.421B] outbound from the port 421B, next establishing a transmit connection from the PLCC-controller port 429B to the port 422B to transmit an identifier such as [406B.422B] outbound from the port 422B, and so on with respect to each of its remaining externally connected ports 423B and 426B-428B. And certainly other example implementations could be listed.

The PLCC 406B may transmit for a fixed amount of time (e.g., 80 milliseconds (ms)) on each of the ports 421B-423B and 426B-428B, and may or may not make one or more additional loops around, depending on the particular implementation. In some embodiments, the PLCC 406B pauses for the standard transmit time (e.g., 80 ms) when it would otherwise be transmitting via each of the ports 424B and 425B had they been externally connected, perhaps to maintain timing synchronization with other PLCCs; in some embodiments, the PLCC 406B does not execute such pause periods. And certainly other example implementations could be listed.

For their part, the PLCCs 406A and 406C may, perhaps in a round-robin fashion, check for receipt via their various ports of PLCC-and-port identifiers. Upon receipt of any such identifier via a respective one of their ports, the PLCCs 406A and 406C may transmit a report message to the communication-path-management controller 402 to indicate an identified external connection. For example, when the PLCC 406A receives the identifier [406B.421B] via its port 428A, the PLCC 406A may transmit to the communication-path-management controller 402 a report that indicates that an external connection has been identified between the port 428A of the PLCC 406A and the port 421B of the PLCC 406B. This is the communication link 771 that is labeled in FIG. 7 and referred to in FIGS. 8 and 10.

With respect to timing, the PLCC 406A may be listening on each of its externally connected data ports 421A-428A for a time period such as 10 ms, thus resulting in a total listening period of 80 ms that matches the 80-ms duration of the time period during which the PLCC 406B is transmitter the identifier [406B.421B] outbound from the port 421B. The PLCC 406A may then make another loop of spending 10 ms listening on each of its respective externally connected ports 421A-428A, and may do this 8 times for a total of 640 ms, which would match the 640 ms during which the PLCC 406B is spending 80 ms either transmitting from or pausing in connection with each of its 8 potentially externally connected ports. And certainly numerous other timing examples could be described here, as these numbers are presented purely by way of illustration and in no way for limitation.

With respect to the mechanism for listening on a given port, the PLCC 406A would establish a receive connection from the port on which it is listening, via its data bus 434A, to its PLCC-controller port 429A, and thereby be able to collect, analyze, and report the received data at the PLCC controller 430A. When the timing is right to switch to the next port, the PLCC 406A would transition to establishing a receive connection from that next port, again via its data bus 434A to its PLCC controller 430A. It is further noted that a given PLCC controller may report discovered external connections as they are discovered, or may instead collect data regarding multiple discovered external connections and then send a summary report via the system bus 404 to the communication-path-management controller 402. And certainly numerous other example implementations could be listed here.

The PLCC 406C would carry out a similar listening process at the same time that the PLCC 406A is doing so. As stated above, the PLCCs could take turns being the only transmitter while the others listen, or could instead all transmit and all listen at the same time. And other example implementations could be listed here as well. Upon receiving the reports from the various PLCCs 406A-C, the communication-path-management controller 402 could then populate the portion of the external-link mapping table 800 that involves external PLCC-to-PLCC connections.

Moreover, it will be understood by those of skill in the art that a round-robin approach is merely one example, and that others (e.g., random sequence) could be used as well. In an alternative embodiment, the transmitted information from one switch to another is simply a particular signature pattern of data that does not identify a particular switch, port, or switch-and-port combination, but rather is transmitted by particular ports according to a particular schedule that is known to the communication-path-management controller 402 (and to which the transmitting PLCC is instructed to adhere), and the receiving PLCCs could still report the timestamp and particular port at which the signature data sequence was received, and at least some of the external-link mapping table 800 could thereby by populated. And certainly numerous other example implementations could be listed here.

Turning now to the power-based intrusive connection-discovery process, this process is similar in some ways to and different in some ways from the data-based intrusive connection-discovery process. Among the similarities are that external communication links are discovered by causing PLCC-and-port-identifying data to be conveyed across a to-be-discovered external connection from a port of one PLCC to a port of another PLCC. Among the differences are that the power-based intrusive connection-discovery process does not involve the respective data bus, the respective internal-only PLCC-controller data port, or any of the dynamically connectable internal data ports of either PLCC that is involved.

Using the separated components of the view of FIG. 1 for illustration, the components that are involved—with respect to each PLCC—is the respective PLCC controller 130, the respective signal bus 136, the respective transceivers 111-118, and the respective data jacks 101-108 (as well as the respective communication links 105, 109, 115, 119). The reader will recall that, in connection with the data-based intrusive connection-discovery process, the PLCC-and-port identifiers made their way to the data jacks 101-108 (one at a time) from the PLCC controller 130 by way of the communication link 155, the PLCC-controller data port 129, the data bus 134, the internal data ports 121-128, the communication links 115, 119, the transceivers 111-118, and the communication links 105, 109. In contrast, in connection with the power-based intrusive connection-discovery process, the PLCC controller 130 communicates via the signal bus 136 directly with the transceivers 111-118 (again one at a time), which then responsively convey power-cycling patterns at the behest of the PLCC controller 130 via the communication links 105, 109 and out the data jacks 101-108.

If the respective data jack 101-108 (and thus the respective transceiver 111-118) is externally connected at the time (or perhaps the PLCC controller 130 will only instruct those transceivers 111-118 that are externally connected to function in this way, similar to the above description), this power-cycling pattern will be conveyed across the respective external link and will be detectable by the PLCC controller of the other PLCC via the corresponding transceiver. In at least one embodiment, the power-cycling pattern that is transmitted out via a given transceiver is indicative in some encoded way (akin to Morse code) of the particular PLCC and also of the particular port of that PLCC with which the given transceiver is associated.

Several options exist for effecting the transmission of such PLCC-and-port-identifying power-cycling patterns. All of the options essentially involve the PLCC controller 130 transmitting commands to the particular transceiver in order to toggle between a high state and a low (e.g., off) state with respect to the energy that the respective transceiver is emitting via the external communication link. This energy could be a voltage and/or current in the case of transmission via a wire, light energy in the case of fiber-optic transmission, and/or one or more other types of energy used in general to convey data via a medium. Any of the above-described mechanisms (e.g., transmit-disable pin, power-on pin, power-off pin) could be used in various different implementations. Several options also exist for effecting the detection at the other end of such PLCC-and-port-identifying power-cycling patterns, including the above-mentioned ability of transceivers to report and/or be polled for values of pins such as receive-signal-loss, power on, power off, and the like. With synchronized timing between the generation of these power-cycling patterns on one end and the polling for the values that make up such patterns on the other end, the conveyance of PLCC-and-port-identifying data can be accomplished.

Thus, in accordance with the power-based intrusive connection-discovery process, the PLCC controllers of each respective PLCC (i) effect the transmission of PLCC-and-port-identifying data by commanding various different transceivers at various different times via the signal bus 136 to toggle the transceiver state and (ii) effect the detection of PLCC-and-port-identifying data by polling (and/or receiving reports from) various different transceivers at various different times via the signal bus 136. The timing approaches in the power-based intrusive connection-discovery process could be analogous to the above-described timing approaches in the data-based intrusive connection-discovery process, though actual numerical values of the time periods involved would likely be quite different: indeed, the time periods involved in the power-based intrusive connection-discovery process would typically be on the order of seconds rather than milliseconds, though certainly much shorter time periods could be used in various different implementations as deemed suitable by those of skill in the art in various different contexts.

The non-intrusive connection-discovery process operates with respect to substantive data that is transmitted between different PLCCs during the normal flow of data traffic. In one embodiment, the communication-path-management controller 402 sends commands via the system bus 404 to each of the PLCCs 406A-C to arrange a coordinated time period during which each PLCC 406A-C will archive copies of whatever data is being transmitted outbound from its various ports, and will archive such data in association with data that identifies the respective associated port.

In the arrangement that is depicted in FIG. 7, the port mirroring connection 710 could be seen as an example of the PLCC 406A setting up a connection that would allow it to mirror the data that is being transmitted outbound from the port 428A. If a similar port-mirroring connection was set up by the PLCC 406B from the port 421B to the PLCC-controller port 429B, then both the PLCC 406A and the PLCC 406B would have archived the same data at substantially the same time: the PLCC 406A would associate that data with having been outbound from the port 428A, and the PLCC 406B would associate that data with having been inbound at the port 421B.

In some embodiments, the PLCCs 406A-C each report this type of information to the communication-path-management controller 402 via the system bus 404. In such embodiments, the communication-path-management controller 402 may then search for matching sets of data and accordingly discover external connections that can then be recorded in the external-link mapping table 800. In some embodiments, the PLCCs 406A-C report archived received data (and associated receive ports) to the communication-path-management controller 402, which then propagates these received-data reports to the other PLCCs 406A-C, which can then check for matches with their archived transmitted data, and accordingly report discovered external connections to the communication-path-management controller 402 for updating of the external-link mapping table 800. And of course the opposite could be done, where transmit-data reports are disseminated for matching with received-data archives by the various different respective PLCCs 406A-C. And certainly numerous other example implementations could be listed here.

FIG. 9 depicts a second data table, in accordance with at least one embodiment. In particular, FIG. 9 depicts an example internal-link mapping table 900 that may be maintained by the communication-path-management controller 402 in the communication-path database 510. Like the external-link mapping table 800, the internal-link mapping table 900 reflects the arrangement that is depicted in—and described above in connection with—FIG. 7; indeed, the internal-link mapping table 900 shows a data-organization approach that the communication-path-management controller 402 could use to keep track of the internal (i.e., internal to a given one of the PLCCs 406A-C) data-communication links that are depicted in FIG. 7.

The internal-link mapping table 900 is similar in its second through fifth columns to the four columns of the external-link mapping table 800 that is described above. In addition, and by way of further example, the internal-link mapping table 900 further includes a first column that simply indicates in which PLCC (406A, 406B, or 406C) a given internal communication link has been configured. As described above, the communication-path-management controller 402 may configure the respective internal port connections in the respective PLCCs 406A-C by way of configuration messages transmitted from the communication-path-management controller 402 to the respective PLCCs 406A-C via the system bus 404. The communication-path-management controller 402 may store the internal-link mapping table 900 to reflect the substance of such configuration messages that have been transmitted to the various PLCCs 406A-C, perhaps upon receiving confirmation messages back from the respective PLCCs 406A-C that the corresponding internal port-to-port connections have in fact been successfully established. And certainly numerous other possible implementations could be listed here.

FIG. 10 depicts a third data table, in accordance with at least one embodiment. In particular, FIG. 10 depicts an end-to-end path-mapping table 1000 that reflects the configuration depicted in FIG. 7 and also described above in connection with FIG. 8 and FIG. 9, and also includes additional information regarding the four end-to-end communication paths that are depicted in FIG. 7. The end-to-end path-mapping table 1000 includes six columns that, for each path that is represented by a respective row, lists a path ID of the respective path, a first endpoint of the respective path, a path map (in the form of a set of links from the tables 800 and 900) of the respective path, a second endpoint of the respective path, a direction (bidirectional, endpoint 01 to endpoint 02, or endpoint 02 to endpoint 01) of the respective path, and a set of service-level parameters for the respective path.

These service-level parameters that are maintained on an end-to-end-communication-path-specific basis are further discussed below in connection with FIGS. 11-12. Some example path-specific service-level parameters are a secure-path parameter, a minimum throughput, and a requirement for high availability. And certainly other examples could be listed. Like the tables 800 and 900, the table 1000 may be maintained by the communication-path-management controller 402 in the communication-path database 510. And it is noted again that the arrangement of data that is represented collectively by the tables 800, 900, and 1000 is provided by way of example and not limitation, as certainly other data-arrangement approaches could be used as deemed suitable by those of skill in the relevant art in a given context. Moreover, it is noted that, with respect to all three of the data tables 800, 900, and 1000, numerous other data records could be present as well, as represented by the ellipses in one or more rows of each table.

Figure 11:
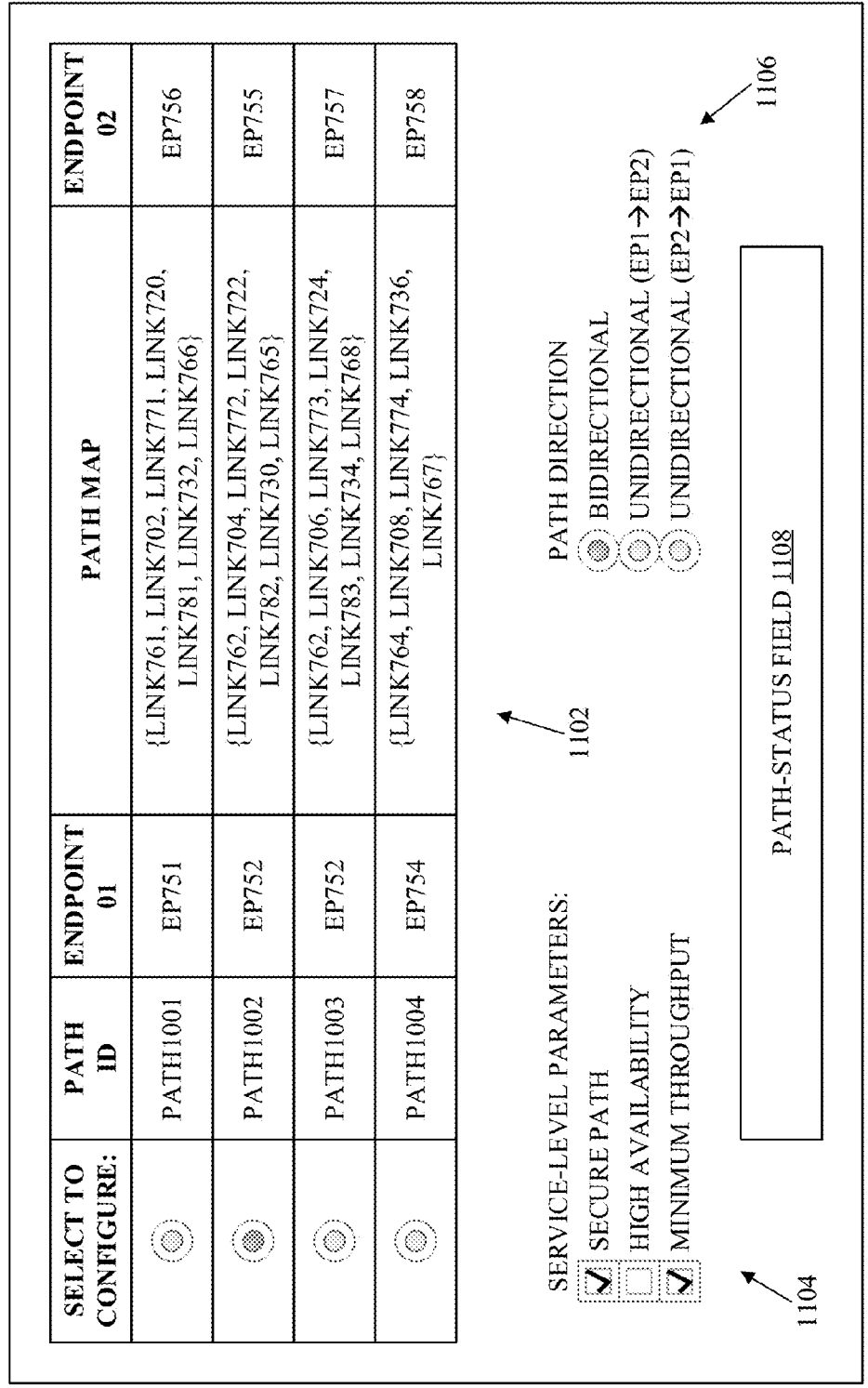
FIG. 11 depicts a user-interface-based path-configuration tool, in accordance with at least one embodiment.

FIG. 11 depicts a user-interface-based path-configuration tool, in accordance with at least one embodiment. In particular, FIG. 11 depicts an example path-configuration tool 1100 that, in at least one embodiment, the communication-path-management controller 402 provides via the user interface 514. In the depicted example, the path-configuration tool 1100 includes a path-selection display 1102, a service-level-parameters display 1104, a path-direction display 1106, and a path-status field 1108. This selection and arrangement of user-interface elements is provided by way of example and not limitation, as certainly different and/or additional user-interface elements could be present in various different embodiments.

As can be seen by inspection of FIGS. 10 and 11, the path-selection display 1102 includes, in its second through fifth columns, the first through fourth columns with respect to the paths 1000-1004 from FIG. 10, respectively identifying the path ID of the respective path, the first endpoint of the respective path, the path map (in the form of a set of links from the tables 800 and 900) of the respective path, and the second endpoint of the respective path. The path-selection display 1102 further includes a first column having a heading that reads "Select to Configure" and a respective radio button for each row (i.e., for each path).

In at least one embodiment, a user selects one of the radio buttons in the path-selection display 1102, whereupon the communication-path-management controller 402 responsively (i) updates the checkboxes in the service-level-parameters display 1104 to reflect the last-chosen (or perhaps default) selections of service-level parameters for the correspondingly selected path, (ii) updates the radio buttons in the path-direction display 1106 to reflect the last-chosen (or perhaps default) direction setting for the correspondingly selected path, and (iii) updates the path-status field 1108 with any relevant status information pertaining to the correspondingly selected path. Upon selecting a given radio button associated with a given end-to-end communication path, a user may then be able to set one or more path-specific service-level parameters by checking or unchecking various checkboxes such as the example checkboxes shown at 1104 in FIG. 11. A user may instead or also be able to set a path direction by selecting a radio button from a set of path-direction-selection radio boxes such as the examples shown at 1106 in FIG. 11. The user may also be able to see information displayed in the path-status field 1108. And certainly numerous other user-interface configurations and arrangements could be described here by way of example.

As explained more fully below, the path-status field 1108 may, at various times, in various situations, and in various different embodiments display information such as warnings, alerts, indicia that a signal level is low (or OK) at one or more ports (i.e., transceivers associated with ports as described above) on a given end-to-end communication path, readouts regarding latency measurements and/or comparisons of latency measurements to latency thresholds (i.e., indicia of high latency, satisfactory latency, low latency, and/or the like), recommendations that a given end-to-end path be rerouted, indicia that a given end-to-end communication path has been (automatically or manually) rerouted, indicia that a given end-to-end communication path has been disabled, and/or any one or more user-interface indicia deemed suitable by those of skill in the relevant art in a given context.

Figure 12:
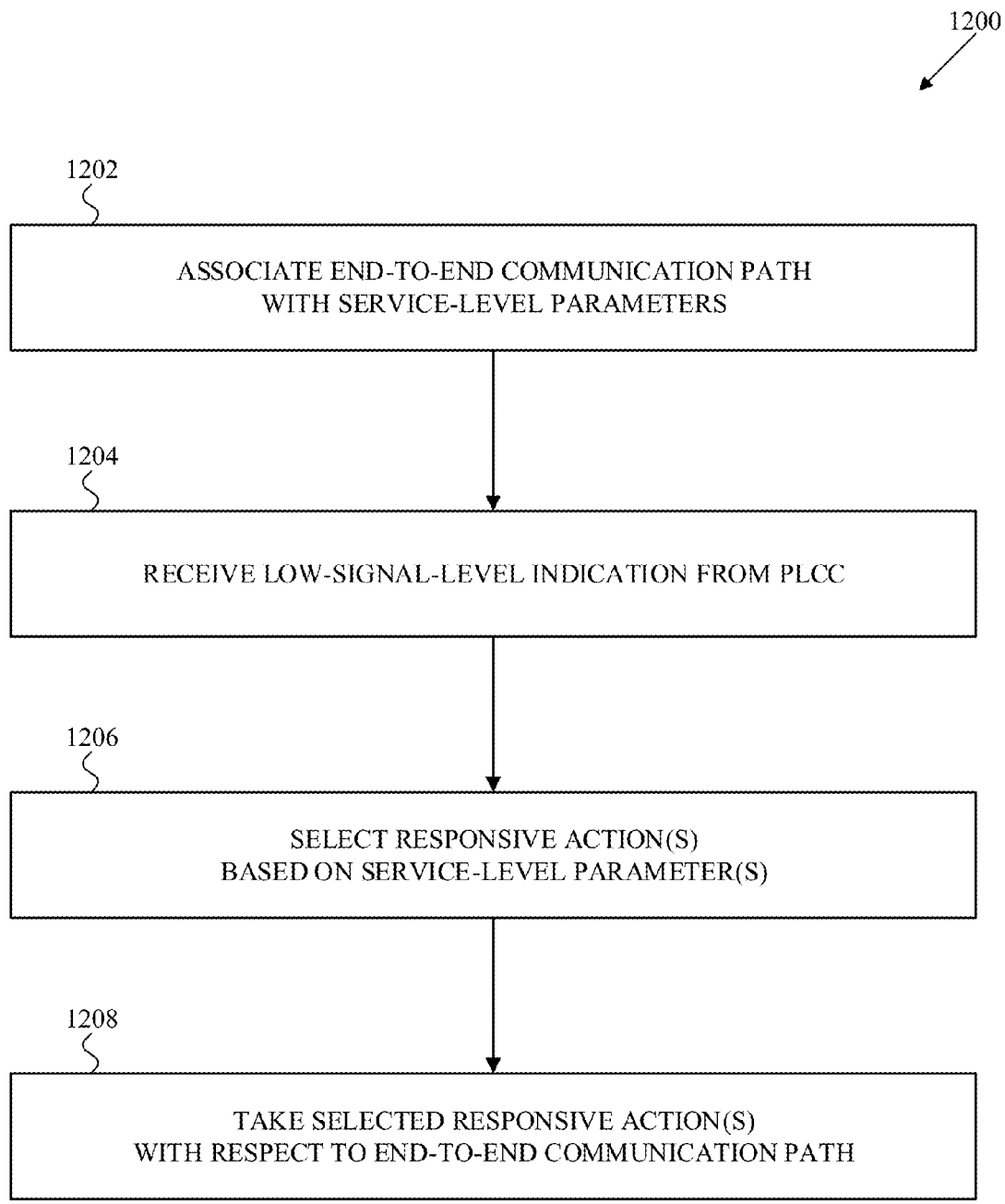
FIG. 12 depicts a first method, in accordance with at least one embodiment.

FIG. 12 depicts a first method, in accordance with at least one embodiment. In particular, FIG. 12 depicts an example method 1200. In the ensuing description of FIG. 12, the method 1200 is described as being carried out by the communication-path-management controller 402. This is by way of example, as in other embodiments the method 1200 may be carried out by any communication and computing device that is suitable equipped, programmed, and configured to carry out functions including those described herein with respect to the method 1200. Moreover, an also by way of example, the method 1200 is described below in a manner that uses the above-described end-to-end communication path 1002 for illustration. Moreover, in at least one embodiment, prior to carrying out the method 1200, the communication-path-management controller 402 establishes the end-to-end communication path 1002 at least in part by transmitting path-configuration commands to the respective PLCCs 406A-C.

At step 1202, the communication-path-management controller 402 associates the end-to-end communication path 1004 with one or more service-level parameters. As one example, the communication-path-management controller 402 associates the end-to-end communication path 1002 with a secure-path service-level parameter and also with a minimum-throughput service-level parameter, consistent with what is shown in FIG. 11. Other examples of service-level parameters that the communication-path-management controller 402 may in various different embodiments associate on a path-specific basis with one or more end-to-end communication paths include a high-availability parameter, a maximum-latency parameter, and/or any other service-level parameter deemed suitable by those of skill in the art for a given implementation or in a given context.

The meanings and significances of the various path-specific service-level parameters that are described herein will be evident to those of skill in the art having the benefit of this description. Though in general, it may be stated that a secure-path service-level parameter corresponds with a heightened level of security as compared with an end-to-end communication path that is not associated with a secure-path service-level parameter. Also, a high-availability service-level parameter may correspond with preparations being made for rerouting a communication path and/or rerouting being responsively carried out upon detection of a drop in a communication path between a respective pair of endpoints. A minimum-throughput service-level parameter may be associated with measuring data-throughput rates and taking responsive actions (e.g., rerouting, canceling allocations of other resources, etc.) to maintain service at a given level of data throughput. Additionally, a maximum-latency service-level parameter may be associated in a similar way with measurements and responsive actions associated with providing end-to-end service with no more than a certain amount of latency. And certainly numerous other examples could be listed here.

At step 1204, the communication-path-management controller 402 receives a low-signal-level indication from at least one PLCC on the communication path 1004, and responsively carries out the below-described steps 1206 and 1208. In at least one embodiment, the low-signal-level indication includes a signal-to-noise ratio (SNR). In at least one embodiment, receiving the low-signal-level indication includes receiving the low-signal-level indication via a respective signal-bus connection with the at least one PLCC on the communication path 1002. In an example scenario, the communication-path-management controller 402 receives an indication of a low signal level being detected at the transceiver associated with port 422B of the PLCC 406B via the signal bus 436B, the PLCC controller 430B, the PLCC-control port 440B, and the system bus 404.

At step 1206, the communication-path-management controller 402 selects at least one responsive action based at least in part on the one or more service-level parameters that the communication-path-management controller 402 is maintaining in association with the end-to-end communication path 1002. Various different options for responsive actions are discussed below in connection with step 1208, though these are presented by way of example and not limitation, as any responsive actions deemed suitable by those of skill in the art could be implemented in a given context.

At step 1208, the communication-path-management controller 402 takes the one or more responsive actions that the communication-path-management controller 402 selected at step 1206 with respect to the end-to-end communication path 1002.

In an embodiment in which the one or more service-level parameters—that the communication-path-management controller 402 is maintaining in association with the end-to-end communication path 1002—includes a secure-path parameter, the at least one selected responsive action includes storing a secure-path-fault indication. In another such embodiment, the at least one selected responsive action includes presenting a secure-path-fault alert via a user interface, perhaps via the path-status field 1108 of the path-configuration tool 1100.

In an embodiment in which the one or more service-level parameters includes a high-availability parameter, the at least one selected responsive action includes storing a high-availability-fault indication. In another such embodiment, the at least one selected responsive action includes presenting a high-availability-fault alert via a user interface, perhaps via the path-status field 1108 of the path-configuration tool 1100.

In an embodiment in which the one or more service-level parameters includes a minimum-throughput parameter, the at least one selected responsive action includes storing a minimum-throughput-fault indication. In another such embodiment, the at least one selected responsive action includes presenting a minimum-throughput-fault alert via a user interface, perhaps via the path-status field 1108 of the path-configuration tool 1100.

In at least one embodiment, the at least one selected responsive action includes transmitting, to at least one of the PLCCs 406A-C, a disable-path command to disable the end-to-end communication path 1002. Such a responsive action may be taken in response to receiving a low-signal-level indication when a secure-path service-level parameter is among the service-level parameters that the communication-path-management controller 402 is maintaining in association with the end-to-end communication path 1002.

In at least one embodiment, the at least one selected responsive action includes rerouting the end-to-end communication path 1002 at least in part by transmitting respective routing-reconfiguration commands to one or more of the PLCCs 406A-C. In at least one such embodiment, rerouting the end-to-end communication path 1002 includes (i) determining an alternate route for the end-to-end communication path 1002 among the PLCCs 406A-C and (ii) selecting the one or more respective routing-reconfiguration commands based at least in part on the determined alternate route. In at least one embodiment that involves rerouting the end-to-end communication path 1002, the one or more service-level parameters includes a high-availability parameter, and the communication-path-management controller 402 also predetermines a reserved backup route for the end-to-end communication path 1002; in such embodiments, the communication-path-management controller 402 reroutes the end-to-end communication path 1002 along the predetermined reserved backup route; in at least one such embodiment, the communication-path-management controller 402 predetermines the reserved backup route for the end-to-end communication path 1002 in response to receiving a command to do so via the user interface 514.

As described above, the example end-to-end communication path 1002 spans from the endpoint 752 to the endpoint 755, and involves all three of the PLCCs 406A-C. As can be seen in FIG. 7, the endpoint 752 communicates with the PLCC 406A (and in particular the port 422A) via the communication link 762; also, the endpoint 755 communicates with the PLCC 406C (and in particular the port 428C) via the communication link 765. In the end-to-end communication path 1002, it can be seen that neither the endpoint 752 nor the endpoint 755 communicates directly with any port of the PLCC 406B. Thus, it could be said with respect to the end-to-end communication path 1002 that the PLCCs 406A and 406C could be considered first-end and second-end PLCCs (where either could be the first-end PLCC and the other the second-end PLCC, though in this description the PLCC 406A is referred to as the first-end PLCC while the PLCC 406C is referred to as the second-end PLCC).

In an embodiment in which the one or more service-level parameters—that the communication-path-management controller 402 is maintaining in association with the end-to-end communication path 1002—includes a maximum-latency parameter, the communication-path-management controller 402 carries out the functions of (i) determining a latency measurement for the end-to-end communication path at least in part by communicating with the first-end PLCC 406A and the second-end PLCC 406C and (ii) identifying a maximum-latency fault condition based at least in part on the determined latency measurement and at least in part on the maximum-latency parameter. In various different embodiments, the determined latency measurements could be one-way and/or round-trip latency measurements.

In an example, the communication-path-management controller 402 instructs the first-end PLCC 406A to send a particular data sequence from the port 422A (and to report back the time at which it was sent) and further instructs the second-end PLCC 406C to report the time at which that particular data sequence arrives at the port 428C. The communication-path-management controller 402 may then compute the difference between those two times and compare that result to a latency threshold (i.e., to the maximum-latency parameter).

Such would be an approach for determining and evaluating latency on a one-way basis. In at least one embodiment, the communication-path-management controller 402 further instructs the PLCC 406C to loop (i.e. send, transmit, or the like) that or another particular data sequence back towards the first-end PLCC 406A, and further instructs the first-end PLCC 406A to report the time at which that data sequence arrives at the port 422A. The communication-path-management controller 402 could then determine a round-trip latency for a given end-to-end communication path (or at least for the portion of the end-to-end communication path that extends between the ports 422A and 428C), and could then compare that determined round-trip latency to a latency threshold (i.e., to the maximum-latency parameter).

Upon determining that a computed (i.e., determined) latency measurement exceeds a given threshold, the communication-path-management controller 402 may then take one or more latency-mitigation actions with respect to the end-to-end communication path 1002. In at least one embodiment, the at least one latency-mitigation action includes (i) identifying an alternate path that has a current latency measurement that would not exceed the maximum-latency parameter and (ii) rerouting the end-to-end communication path 1002 along that alternate path. And certainly numerous other example implementations could be listed here as well.

Figure 13:
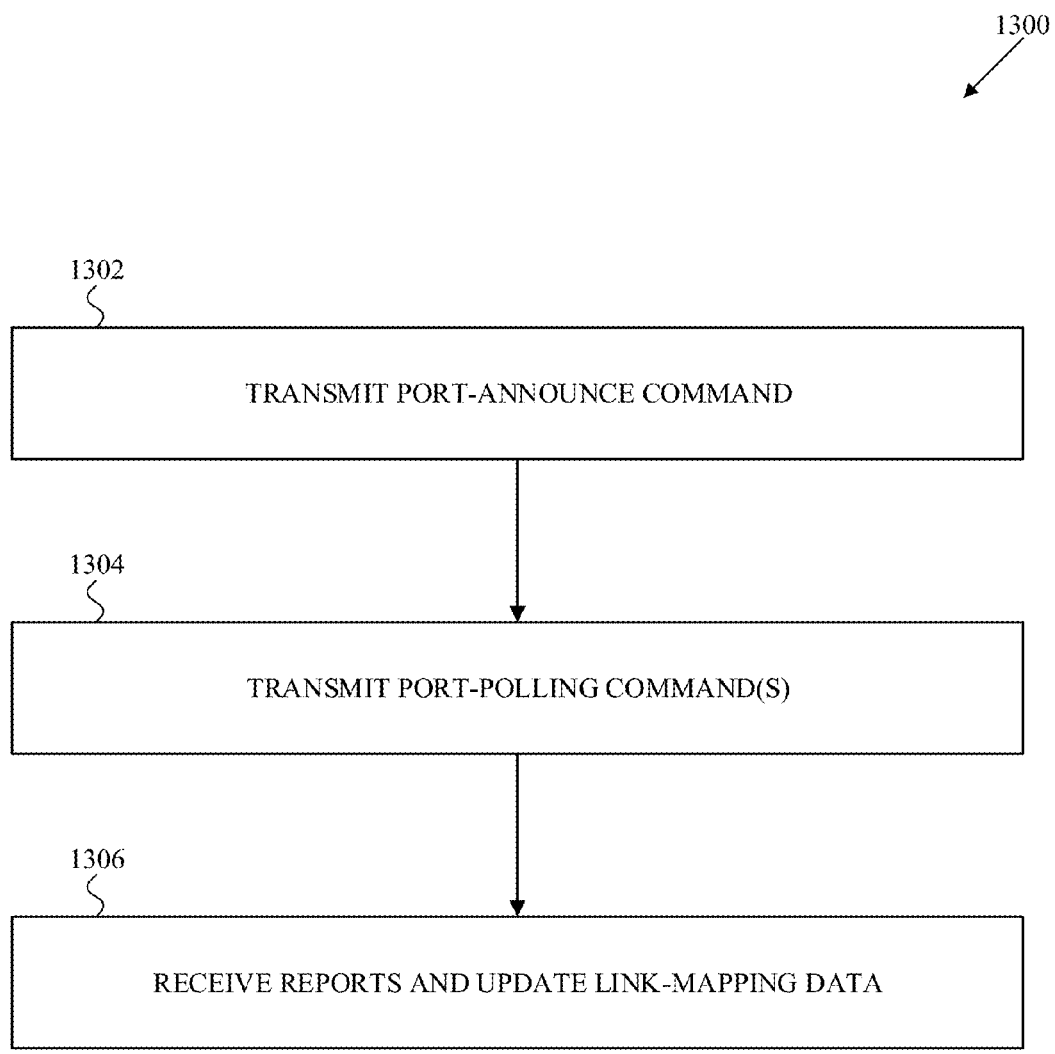
FIG. 13 depicts a second method, in accordance with at least one embodiment.

FIG. 13 depicts a second method, in accordance with at least one embodiment. In particular, FIG. 13 depicts a method 1300 that in at least one embodiment is carried out by the communication-path-management controller 402. Indeed, the method 1300 is described herein as being carried out by the communication-path-management controller 402, though this is by way of example and not limitation, as the method 1300 could be carried out by any single computing-and-communication device or combination of multiple such devices deemed suitable for a given implementation by those of skill in the relevant art. Another embodiment takes the form of a communication-path-management controller that includes a data-communication interface configured to communicate with a plurality of PLCCs that are interconnected along an end-to-end communication path; a processor; and data storage containing instructions executable by the processor for causing the communication-path-management controller to carry out at least the functions of the method 1300.

At step 1302, the communication-path-management controller 402 transmits a port-announce command to the PLCC 406B. The port-announce command instructs the PLCC 406B to transmit at least one switch-and-port-identifying data sequence, which will be received by at least one of the other PLCCs 406A, 406C. In this example, the port-announce command instructs the PLCC 406B to transmit switch-and-port-identifying sequences; due to the example arrangement, various different ones of those switch-and-port-identifying sequences would be received by either the PLCC 406A or the PLCC 406C.

At step 1304, the communication-path-management controller 402 transmits a port-polling command to the at least one other PLCC 406A, 406C (and in this example to both). The port-polling command instructs each of the other PLCCs 406A and 406C to (i) poll its respective ports for receipt of any switch-and-port-identifying data sequence and (ii) reply back with reports of respective pairs of (a) switch-and-port-identifying data sequences and (b) identifying data of the polled ports at which such data sequences were received.

At step 1306, the communication-path-management controller 402 receives at least one of the reports and uses the at least one received report to update the external-link mapping table 800, which as explained above is reflective of how the PLCCs 406A-C are interconnected.

In at least one embodiment, the communication-path-management controller 402 also cycles through each of the other PLCCs 406A, 406C and, for each such other PLCC 406A, 406C: transmits a port-announce command to the respective other PLCC; transmits port-polling commands to the remaining PLCCs; and receives further reports and uses the received further reports to further update the external-link mapping table 800. In at least one such embodiment, the communication-path-management controller 402 also updates the external-link mapping table 800 to also reflect external connections between one or more respective endpoints 751-758 and respective specific ports of the various PLCCs 406A-C. In at least one such embodiment, the communication-path-management controller 402 also maintains internal-link mapping data (e.g., the internal-link mapping table 900) that reflects intra-PLCC port mappings. In at least one such embodiment, the communication-path-management controller 402 also uses the updated external-link mapping table 800 and the maintained internal-link mapping table 900 to update path-mapping data (e.g., the end-to-end path-mapping table 1000) that specifies mapping of one or more end-to-end communication paths extending between respective pairs of endpoints 751-758 via the plurality of interconnected PLCCs 406A-C.

In at least one embodiment, the port-announce command instructs the PLCC 406B to transmit the at least one switch-and-port-identifying data sequence outbound in a round-robin manner with respect to the data ports of the PLCC 406B; given the example arrangement, various different ones of these switch-and-port-identifying data sequences will be received by one of the other PLCCs 406A or 406C. In at least one embodiment, the port-polling command instructs each of the at least one other PLCCs 406A, 406C to poll its respective ports for receipt of any switch-and-port-identifying data sequence in a round-robin manner. In at least one embodiment, each switch-and-port-identifying data sequence includes an identifier of the transmitting PLCC 406A-C and an identifier of the particular port on that transmitting PLCC 406A-C via which the switch-and-port-identifying data sequence is being transmitted.

In at least one embodiment, each 406A-C includes a PLCC-controller port to which the PLCC 406A-C can mirror the output of any other ports of the PLCC 406A-C, and a given PLCC 406A-C polling a given port includes the given PLCC 406A-C mirroring the given port to the PLCC-controller port of the given PLCC 406A-C. In at least one embodiment, the port-announce command causes the PLCC 406B to transmit the switch-and-port-identifying data sequence from each of its data ports for at least a first minimum amount of time. In at least one embodiment, the port-polling command causes each other PLCC 406A, 406C to poll each of its respective ports for at least a second minimum amount of time.

Figure 14:
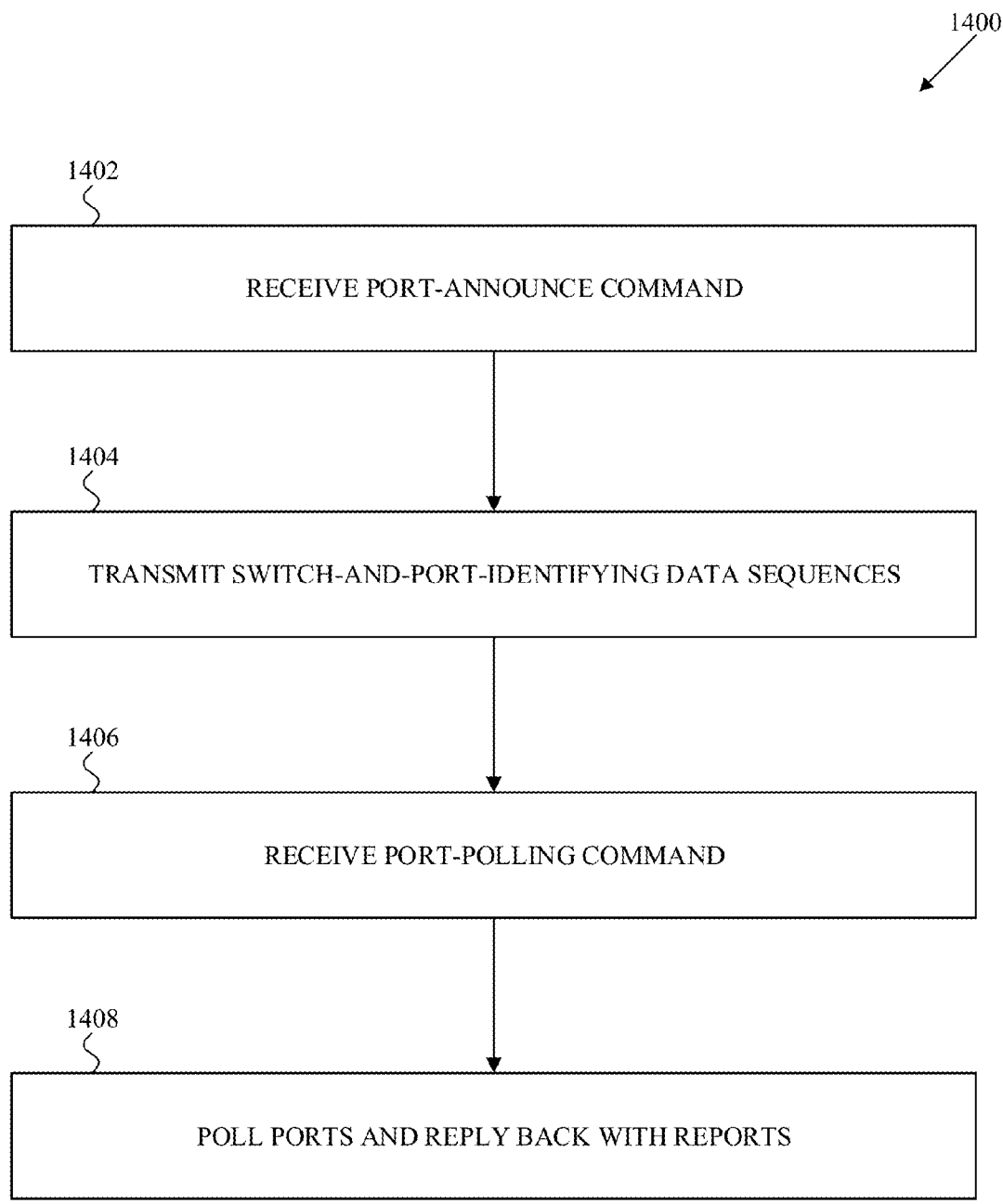
FIG. 14 depicts a third method, in accordance with at least one embodiment.

FIG. 14 depicts a third method, in accordance with at least one embodiment. In particular, FIG. 14 depicts a method 1400 that in at least one embodiment is carried out by a PLCC. Indeed, the method 1400 is described herein as being carried out by the PLCC 406B, though this is by way of example and not limitation. Another embodiment takes the form of a PLCC that includes a data-communication interface; a processor; and data storage containing instructions executable by the processor for causing the PLCC to carry out at least the functions of the method 1400.

At step 1402, the PLCC 406B receives a port-announce command and, at step 1404, responsively transmits at least one switch-and-port-identifying data sequence, where various different ones of those transmitted switch-and-port-identifying data sequences will be received by the other PLCCs 406A, 406C. In at least one embodiment, the PLCC 406B does this from its respective ports 421B-428B in a round-robin manner.

At step 1406, the PLCC 406B receives a port-polling command and, at step 1408, responsively (i) polls its respective ports 421B-428B for receipt of any switch-and-port-identifying data sequence and (ii) replies back (e.g., to the communication-path-management controller 402) with reports of respective pairs of (a) switch-and-port-identifying data sequences and (b) identifying data of the polled ports at which such data sequences were received. In at least one embodiment, the PLCC 406B polls its respective ports 421B-428B in a round-robin manner. In at least one embodiment, the PLCC 406B polls its respective ports 421B-428B at least in part by mirroring the given port 421B-428B to the PLCC-controller port 429B. In at least one embodiment, the PLCC 406B also transmits to the communication-path-management controller 402 at least one port-specific indication of a connection with an endpoint 751-758.

Figure 15:
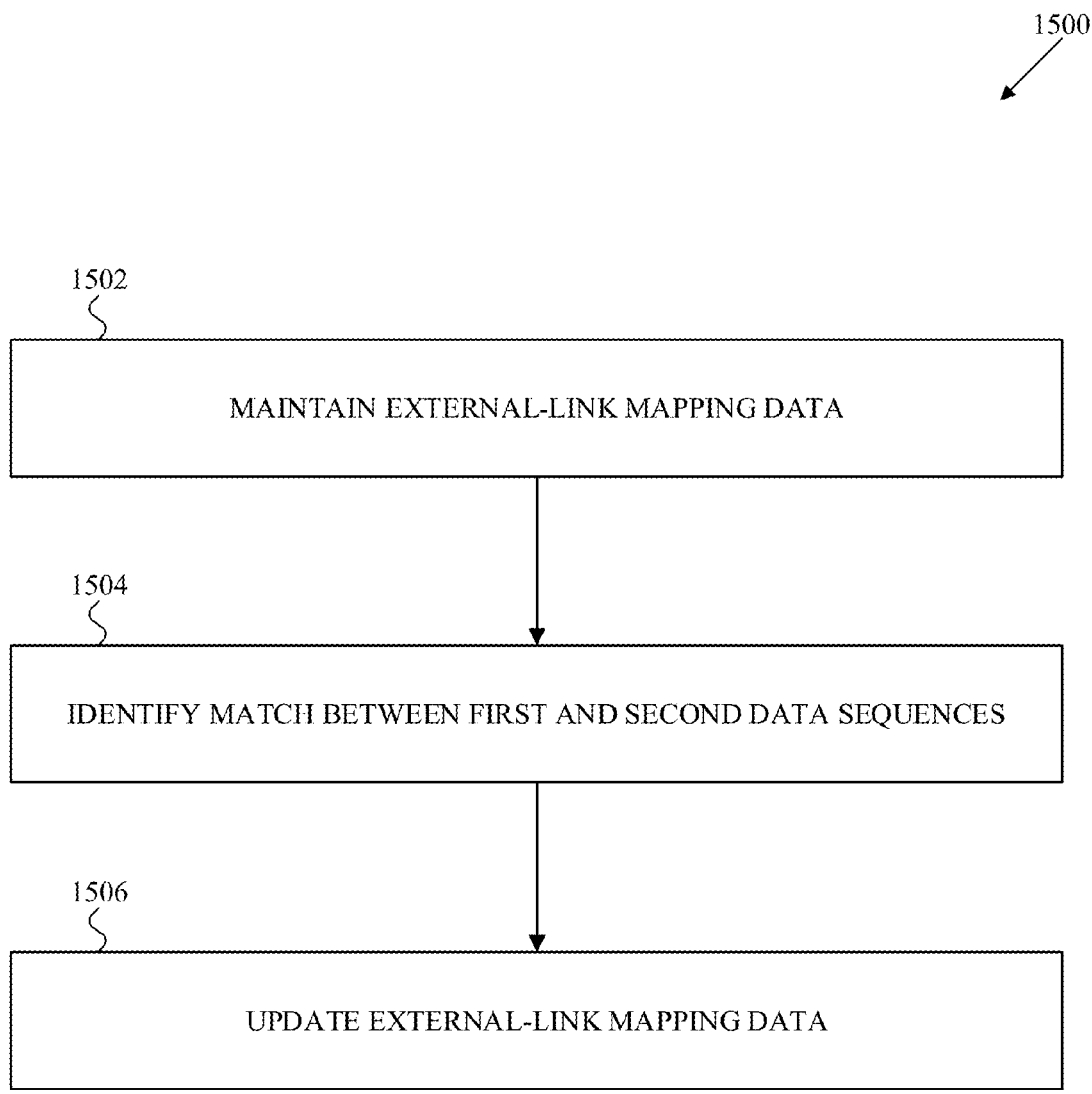
FIG. 15 depicts a fourth method, in accordance with at least one embodiment.

FIG. 15 depicts a fourth method, in accordance with at least one embodiment. In particular, FIG. 15 depicts a method 1500 that is described herein by way of example as being carried out by the communication-path-management controller 402. The method 1500 is a method of discovering external connections among a plurality of interconnected PLCCs.

At step 1502, the communication-path-management controller 402 maintains the above-described external-link mapping table.

At step 1504, the communication-path-management controller 402 determines that a first data sequence matches a second data sequence, where the first data sequence was transmitted outbound via the port 421B of the PLCC 406B, and where the second data sequence was received inbound via the port 428A of the PLCC 406A. The first (and second) data sequence may be or include data that identifies the PLCC 406B and the port 421B; as an example, the first (and second) data sequence could be the above-referenced identifier [406B.421B]. Carrying out step 1504 could involve using any one or more of the connection-discovery processes described herein, and/or any other connection-discovery process deemed suitable by those of skill in the relevant art for a given implementation or in a given context.

At step 1506, responsive to determining that the first data sequence matches the second data sequence, the communication-path-management controller 402 updates the external-link mapping table to indicate the external connection 771 between the port 421B of the PLCC 406B and the port 428A of the PLCC 406A.

In carrying out the method 1500, the communication-path-management controller 402 may also (i) instruct the PLCC 406B to transmit the first data sequence outbound via the port 421B (perhaps for at least a first amount of time) and (ii) instruct the PLCC 406A to monitor at least the port 428A for data sequences (perhaps for a second amount of time that is less than the first amount of time). The ratio of the first amount of time to the second amount of time may equal the number of externally accessible data ports per PLCC. For example, the first amount of time could be 80 ms and the second amount of time could be 10 ms, and 8 externally accessible data ports may be included in each PLCC. And other examples could be listed as well.

The PLCC 406B may transmit the first data sequence outbound via the port 421B at least in part by (i) establishing a first internal data connection over the data bus 434B between the internal-only PLCC-controller port 429B and the first port 421B and (ii) transmit the first data sequence outbound via the port 421B from the PLCC controller 430B via the first internal data connection. Moreover, the PLCC 406A may monitor at least the port 428A for data sequences at least in part by (i) establishing a second internal data connection over the data bus 434A between the internal-only PLCC-controller port 429A and the port 428A and (ii) monitoring the port 428A for data sequences using the PLCC controller 430A via the second internal data connection.

In carrying out the method 1500, the communication-path-management controller 402 may also instruct the PLCCs in the plurality of PLCCs to report any endpoints to which their various respective ports are connected.

Figure 16:
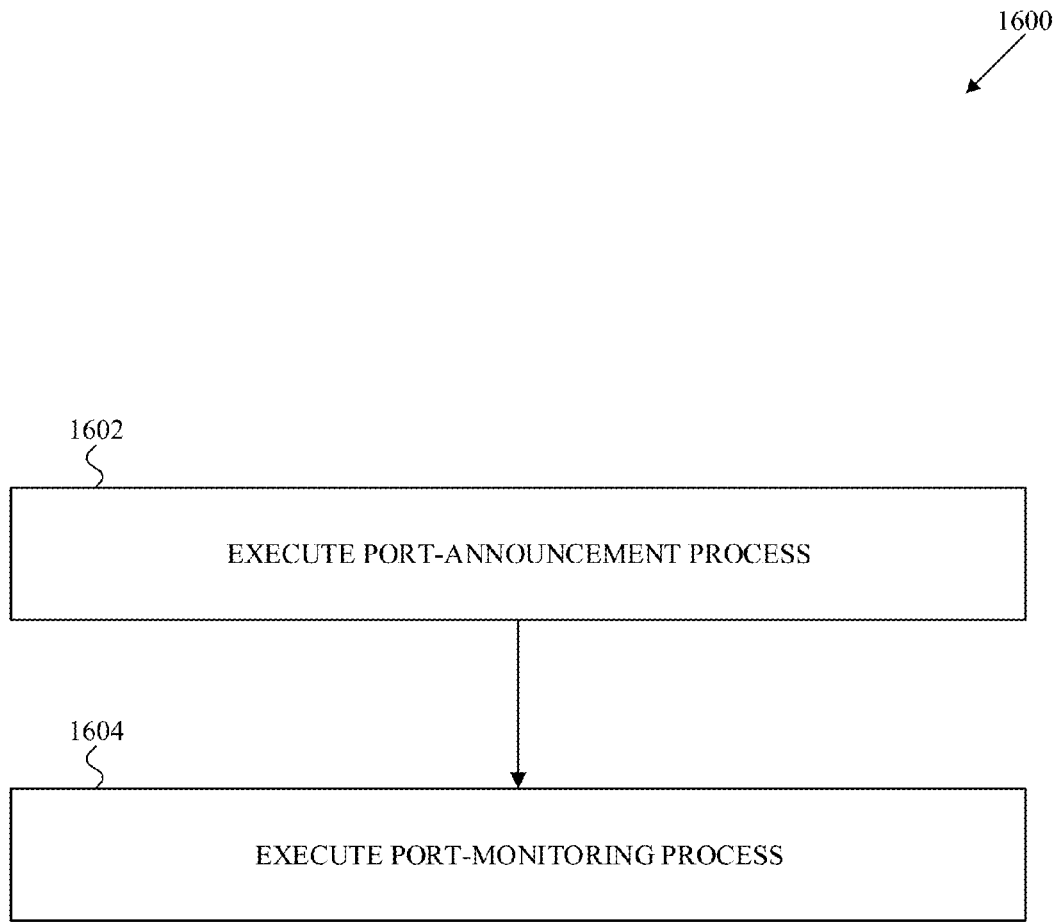
FIG. 16 depicts a fifth method, in accordance with at least one embodiment.

FIG. 16 depicts a fifth method, in accordance with at least one embodiment. In particular, FIG. 16 depicts a method 1600 that is described below by way of example as being carried out by the PLCC 406B. Moreover, an embodiment takes the form of a PLCC that includes (i) a communication interface (e.g., the PLCC-control port 440) for communicating with the communication-path-management controller 402; (ii) a switching circuit (similar to the switching circuit 132) that includes (a) a plurality of externally accessible data ports (421B-428B), (b) an internal-only PLCC-controller port (429B), and (c) a data bus (434B) that is dynamically configurable for mapping data connections (1) among the externally accessible data ports (421B-428B) and (2) between the externally accessible data ports (421B-428B) and the internal-only PLCC-controller port (429B); (iii) a plurality of transceivers (similar to the transceivers 111-118) respectively connected to the externally accessible data ports (421B-428B) and further connected to a signal bus (436B); (iv) a plurality of data jacks (similar to the data jacks 101-108) respectively connected to the transceivers (111-118); and (v) a PLCC controller (430B) that is (a) interfaced with the communication interface (the PLCC-control port 440B), the data bus (434B), the signal bus (436B), and the internal-only PLCC-controller port (429B) and (b) configured to carry out at least the functions of the herein-described method 1600.

At step 1602, the PLCC 406B executes a port-announcement process that includes transmitting, outbound from each of the data jacks (corresponding respectively with the ports 421B-428B), PLCC-and-port-identifying data that identifies the PLCC 406B and the respective externally accessible data port 421B-428B associated with the respective data jack.

At step 1604, the PLCC 406B executes a port-monitoring process that includes (i) monitoring for receipt via the respective data jacks (corresponding respectively with the ports 421B-428B) of PLCC-and-port-identifying data from another PLCC and (ii) sending one or more external-connection-mapping messages to the communication-path-management controller via the communication interface for use in updating external-link mapping data.

In at least one embodiment, transmitting the PLCC-and-port-identifying data includes (i) establishing a transmit connection between the PLCC controller 430B and the respective data jack (that corresponds to the port 421B) via the PLCC-controller port 440B, the data bus 434B, the associated externally accessible data port 428B, and the associated transceiver (that corresponds to the port 421B) and (ii) transmitting the PLCC-and-port-identifying data out the respective data jack (that corresponds to the port 421B) from the PLCC controller 430B via the established transmit connection.

In at least one embodiment, monitoring for receipt of PLCC-and-port-identifying data includes (i) establishing respective receive connections between the PLCC controller 430B and respective data jacks (that correspond respectively with the ports 421B-428B) via the PLCC-controller port 440B, the data bus 434B, the respective associated externally accessible data ports 421B-428B, and the respective associated transceivers (that correspond respectively with the ports 421B-428B) and (ii) monitoring for receipt of PLCC-and-port-identifying data via the respective established receive connections.

In at least one embodiment, transmitting the PLCC-and-port-identifying data includes instructing a respective transceiver (that corresponds with a respective one of the ports 421B-428B) via the signal bus 436B to power cycle in a pattern reflective of the associated PLCC-and-port-identifying data.

In at least one embodiment, monitoring for receipt of PLCC-and-port-identifying data includes (i) polling respective transceivers (that correspond respectively with the ports 421B-428B) via the signal bus 436B for detection of power-cycling patterns reflective of associated PLCC-and-port-identifying data. In at least one such embodiment, instructing a respective transceiver via the signal bus 436B to power cycle in a pattern reflective of the associated PLCC-and-port-identifying data includes sending to a transmit-disable pin of the respective transceiver (that corresponds with a respective one of the ports 421B-428B) a series of signals to toggle a transmit function of the respective transceiver according to the pattern.

In at least one embodiment, the one or more external-connection-mapping messages include data indicative of received PLCC-and-port-identifying data.

In at least one embodiment, the one or more external-connection-mapping messages include data indicative of external connection discovered by the PLCC 406B.

What is claimed is:

1. A method comprising:
   at a communication-path-management controller, establishing at least one end-to-end communication path of a plurality of end-to-end communication paths, and associating the established at least one end-to-end communication path with a secure-path parameter, wherein each of the plurality of end-to-end communication paths traverses a plurality of links between interconnected physical-layer cross connects (PLCCs), each link comprising at least one data port, each data port having a respective transceiver;
   maintaining in a database of the communication-path-management controller (i) a mapping of all end-to-end paths and (ii) a mapping of all links;
   receiving a low-signal-level indication message from at least one PLCC on the at least one end-to-end communication path, via a system bus connected between the at least one PLCC and the communication-path-management-controller, the message indicating that a low-signal-level condition was detected at a transceiver in the at least one PLCC, and responsively:
   searching (i) the mapping of all links to determine a link ID associated with the transceiver and (ii) the mapping of all end-to-end paths to determine a path ID associated with the link ID;
   determining that the path ID is associated with the secure-path parameter; and
   responsively storing a secure-path fault indication.

2. The method of claim 1, wherein establishing the at least one end-to-end communication path comprises transmitting path-configuration commands to respective PLCCs.

3. The method of claim 1, wherein receiving the low-signal-level indication message further comprises the transceiver communicating the low-signal-level indication message to the PLCC via a respective signal-bus connection.

4. The method of claim 1, further comprising presenting a secure-path-fault alert via a user interface.

5. The method of claim 1, wherein the at least one end-to-end communication path is further associated to a high-availability parameter.

6. The method of claim 5, wherein in response to receiving the low-signal-level indication message from at least one PLCC on the at least one end-to-end communication path, further comprises:

determining that the path ID is associated with the high-availability parameter; and responsively storing a high-availability-fault indication.

7. The method of claim 6, further comprising presenting a high-availability-fault alert via a user interface.

8. The method of claim 1, wherein the at least one end-to-end communication path is further associated to a minimum-throughput parameter.

9. The method of claim 8, wherein in response to receiving a low-signal-level indication message from at least one PLCC on the at least one end-to-end communication path, further comprises storing a minimum-throughput-fault indication.

10. The method of claim 9, further comprising presenting a minimum-throughput-fault alert via a user interface.

11. The method of claim 1, wherein in response to receiving the low-signal-level indication message from the at least one PLCC on the at least one end-to-end communication path, further comprises transmitting, to at least one other PLCC in the plurality of PLCCs, a disable-path command to disable the at least one end-to-end communication path.

12. The method of claim 1, wherein in response to receiving the low-signal-level indication message from at least one PLCC on the at least one end-to-end communication path, further comprises rerouting the at least one end-to-end communication path at least in part by transmitting respective routing-reconfiguration commands to one or more PLCCs.

13. The method of claim 12, wherein rerouting the end-to-end communication path further comprises:

determining an alternate route for the at least one end-to-end communication path among a plurality of PLCCs; and selecting one or more of the respective routing-reconfiguration commands based at least in part on the determined alternate route.

14. The method of claim 12, wherein the at least one end-to-end communication path is further associated to a high-availability parameter, the method further comprising:

predetermining a reserved backup route for the at least one end-to-end communication path, wherein rerouting the at least one end-to-end communication path comprises rerouting the at least one end-to-end communication path along the predetermined reserved backup route.

15. The method of claim 14, wherein predetermining the reserved backup route for the at least one end-to-end communication path comprises predetermining the reserved backup route for the at least one end-to-end communication path responsive to receiving a reserve-path instruction via a user interface.

16. The method of claim 1, wherein:

the interconnected PLCCs comprises a first-end PLCC and a second-end PLCC; and the at least one end-to-end communication path is further associated to a maximum-latency parameter, the method further comprising:

determining a latency measurement for the at least one end-to-end communication path at least in part by communicating with the first-end PLCC and the second-end PLCC;

identifying a maximum-latency fault condition based at least in part on the determined latency measurement and at least in part on the maximum-latency parameter, and responsively taking at least one latency-mitigation action with respect to the at least one end-to-end communication path.

17. The method of claim 16, wherein the at least one latency-mitigation action comprises:

identifying an alternate path that has a current latency measurement that would not exceed the maximum-latency parameter; and rerouting the at least one end-to-end communication path along the identified alternate path.

18. A communication-path-management controller comprising:

a data-communication interface configured to communicate with a plurality of PLCCs that are interconnected along an end-to-end communication path;

a processor; and data storage containing instructions executable by the processor for causing the communication-path-management controller to carry out a set of functions, wherein the set of functions includes:

establishing at least one end-to-end communication path of a plurality of end-to-end communication paths, and associating the established at least one end-to-end communication path with a secure-path parameter, wherein each of the plurality of end-to-end communication paths traverses a plurality of links between interconnected physical-layer cross connects (PLCCs), each link comprising at least one data port, each data port having a respective transceiver;

maintaining in a database of the communication-path-management controller (i) a mapping of all end-to-end paths and (ii) a mapping of all links;

receiving, via the data-communication interface, a low-signal-level indication message from at least one PLCC on the at least one end-to-end communication path, via a system bus connected between the at least one PLCC and the communication-path-management-controller, the message indicating that a low-signal-level condition was detected at a transceiver in the at least one PLCC, and responsively:

searching (i) the mapping of all links to determine a link ID associated with the transceiver and (ii) the mapping of all end-to-end paths to determine a path ID associated with the link ID;

determining that the path ID is associated with the secure-path parameter; and responsively storing a secure-path fault indication.

* * * * *